United States Patent [19]
Taylor et al.

[11] Patent Number: 5,308,906
[45] Date of Patent: May 3, 1994

[54] EXTRUDABLE ELASTOMERIC COMPOSITION HAVING CONTROLLED RATE OF DEGRADATION

[75] Inventors: Jack D. Taylor, Roswell; William B. Haffner, Kennesaw, both of Ga.

[73] Assignee: Kimberly-Clark Corporation, Neenah, Wis.

[21] Appl. No.: 805,128

[22] Filed: Dec. 11, 1991

[51] Int. Cl.$^5$ .................. C08K 5/09; C08K 5/14; D06N 7/04
[52] U.S. Cl. .................. 524/398; 524/394; 524/395; 524/505; 523/124; 523/125; 523/126; 428/152; 428/164; 428/183; 428/224
[58] Field of Search .............. 523/126, 124, 125; 524/398, 505, 395; 525/90, 95; 428/119, 224

[56] References Cited

U.S. PATENT DOCUMENTS

| | | | |
|---|---|---|---|
| 3,144,436 | 8/1964 | Greene et al. | 260/93.7 |
| 3,332,926 | 7/1967 | Baron, Jr. et al. | 260/93.7 |
| 3,763,066 | 10/1973 | Stretanski | 260/23 H |
| 3,887,534 | 6/1975 | Baba et al. | 260/93.7 |
| 3,928,268 | 12/1975 | Sato et al. | 523/126 |
| 3,935,141 | 1/1976 | Potts et al. | 524/398 |
| 3,941,759 | 3/1976 | Taylor et al. | 260/92.8 A |
| 3,994,855 | 11/1976 | Boberg | 260/42.46 |
| 4,075,146 | 2/1978 | Kiss | 260/23 H |
| 4,101,720 | 7/1978 | Taylor et al. | 523/126 |
| 4,251,407 | 2/1981 | Schroeder et al. | 260/23 R |
| 4,360,606 | 11/1982 | Tobias et al. | 523/124 |
| 4,451,589 | 5/1984 | Morman et al. | 523/124 |
| 4,461,853 | 7/1984 | Gilead et al. | 523/126 |
| 4,517,318 | 5/1985 | Miyoshi et al. | 523/126 |
| 4,720,415 | 1/1988 | Wielen et al. | 428/286 |
| 4,888,369 | 12/1989 | Moore, Jr. | 524/100 |
| 4,931,488 | 6/1990 | Chiquet | 523/126 |
| 4,985,024 | 1/1991 | Sipinen | 604/389 |
| 5,093,422 | 3/1992 | Himes | 525/95 |
| 5,135,966 | 8/1992 | Chatterjee et al. | 523/126 |

FOREIGN PATENT DOCUMENTS

88/09354 12/1988 World Int. Prop. O. .

OTHER PUBLICATIONS

JP 48-084,136, Nov. 8, 1973, Abstract (Sumitomo Chemical Co.).

*Primary Examiner*—Paul R. Michl
*Assistant Examiner*—Tae H. Yoon
*Attorney, Agent, or Firm*—Karl V. Sidor

[57] ABSTRACT

An extrudable elastomeric composition including an elastomeric A-B-A' block copolymer where A and A' are each a thermoplastic polymer endblock and where B is a conjugated diene monomer unit having a low degree of residual ethylenic unsaturation; a polyolefin; and an effective amount of a transition metal compound which is substantially uniformly distributed in the blend containing the polyolefin and block copolymer so that the extrudable elastomeric composition is adapted form an elastic sheet that is degraded after less than about 30 days continuous exposure to a thermally oxidative environment. The transition metal compound may be a salt or complex of cobalt and/or manganese and is added in an amount that will provide at least about 0.01 percent, by weight, of the transition metal in the extrudable composition.

28 Claims, 10 Drawing Sheets

EXTRUDABLE ELASTOMERIC COMPOSITION HAVING CONTROLLED RATE OF DEGRADATION

FIELD OF THE INVENTION

The present invention relates to the field of extrudable elastomeric compositions and elastic sheets made therefrom.

BACKGROUND OF THE INVENTION

Many products are made from or contain thermoplastic elastomeric polymers in various elastic components that provide desirable elastic properties, often at a relatively low cost. One particularly useful class of thermoplastic elastomeric polymers are A-B-A' elastomeric block copolymers where A and A' are each a thermoplastic polymer endblock and where B is an elastomeric polymer mid-block. Typically, the elastomeric polymer mid-block is a conjugated diene monomer unit.

However, polymers having a polydiene mid-block tend to be poorly suited for the demanding conditions encountered in certain modern extrusion processes. These polymers may degrade oxidatively if held for a long period of time at high temperatures in the presence of oxygen. Also, products made from these polymers may be placed in environments that can cause the polymers to chemically break down. In order to increase their thermal stability and resistance to oxidation, these elastomeric block copolymers may be hydrogenated to produce copolymers having a low degree of residual ethylenic unsaturation in the polydiene mid-block. Such polymers have essentially saturated olefin midblocks which tend to be thermally stable and resistant to oxidative degradation. Exemplary elastomeric block copolymers having saturated olefin midblocks are the Kraton ® G series rubbers available from the Shell Chemical Company.

Those elastomeric block copolymers can be formulated into extrudable compositions, often with added stabilizers and antioxidants, that are especially well suited for the severe conditions of extrusion processes such as, for example, meltblowing processes. Large quantities of these extrudable compositions are processed into elastic nonwoven webs that are incorporated in a variety of disposable products, including disposable personal care products such as, for example, disposable diapers, disposable work wear and other disposable garments.

Unfortunately, the polymer modifications that provide thermal stability and resistance to oxidation also hinder chemical breakdown of the polymer after the products have been used and disposed of in a composting system. Thus, while some extrudable elastomeric materials will withstand severe processing conditions and, once incorporated into a product, will survive environments that could cause the polymer to chemically break down, there is still a need for an extrudable elastomeric material which will meet those needs and will still break down under typical compost conditions.

When present in certain polymers in sufficient amounts, some transition metals are known under the appropriate conditions to initiate chemical reactions that degrade the physical properties of those polymers. For example, U.S. Pat. No. 3,332,926 issued Jul. 25, 1967 to Baron et al., discloses a process for making a low-molecular weight polyolefin by mixing a high molecular weight polyolefin with a metal salt of a carboxylic acid and then applying heat. According to the patent, from about 0.075 percent to 10 percent, by weight, of a metal salt of a carboxylic acid may be used. It is disclosed that the resulting mixture is heated in an atmosphere that is substantially free of oxygen to a temperature from about 275° to about 450° C. According to the patent, useful metal salts of carboxylic acids include sodium stearate, calcium stearate, magnesium stearate, zinc stearate, sodium oxalate, sodium citrate, sodium acetate, sodium tartrate, and potassium acid phthalate.

U.S. Pat. No. 3,941,759 issued Mar. 2, 1976 to Taylor, et al., discloses a degradable plastic that contains an organic photosensitizer and at least one organic derivative of a transition metal. According to the patent, controlled degradation of the plastic is initiated by photooxidative reaction of the organic photosensitizer. This photo-oxidative reaction is sustained by the organic derivatives of the transition metals. It is disclosed that the compositions described in that patent will gradually oxidize in the dark after an initial short-term exposure to ultraviolet light. Suitable organic photosythesizers are disclosed as including ketones, azo compounds such as azobenzene, organic dyes, and other compounds such as benzophenone. The organic derivatives of transition metals are disclosed as including naphthanates, oleates, acetates, stearates, benzoates, citrates, and similar compounds derived from cobalt, chromium, iron, nickel, manganese, and other transition metals.

U.S. Pat. No. 3,994,855 issued Nov. 30, 1976 to Boberg, discloses a polymer composition which is degradable under the action of ultraviolet light and/or sunlight, and which also may be subject to thermal degradation. According to the patent, thermoplastic polymers or copolymers of α-olefins may be made photosensitive and degradable by employing one or more transition metal compounds.

U.S. Pat. No. 4,931,488 discloses thermoplastic polymer compositions, especially α-olefin polymers that include a biodegradable substance such as, for example, starch, a transition metal compound, and a fatty acid or fatty acid ester. These polymer compositions degrade under the action of heat and/or ultraviolet light. According to the patent, one or more other transition metal compounds may be added to catalyze the degradation.

U.S. Pat. No. 4,360,606 issued Nov. 23, 1982 to Tobias, et al., discloses photodegradable polymer compositions. According to the patent, a degradable polymer may be made which contains at least one photosensitive aliphatic or aromatic ketone and at least one readily auto-oxidizable olefinic compound having an amine with at least one olefinic group.

U.S. Pat. No. 4,461,853 issued Jul. 24, 1984 to Gilead, et al., discloses a controllably degradable vinyl polymer composition which contain a complex of two different metals. According to the patent, a combination of iron and nickel compounds provides an unexpected enhancement in the photo-degradation of vinyl films.

PCT International Publication No. WO 88/09354 discloses a degradable polymer composition which includes a blend of normally stable chemically saturated polymer, a less stable chemically unsaturated polymer or copolymer, an anti-oxidant active over a limited period of time and a latent pro-oxidant, such as an organic salt of a transition metal compound. According to the patent, the normally stable chemically saturated polymer may be a polyolefin such as polyethylene. The less stable chemically unsaturated polymer is disclosed as being a styrene/butadiene block copolymer or natural rubber that provides adequate levels of autoxidizable unsaturation. The transition metal salts are disclosed as being organic acid salts of metals such as cobalt, manganese, or copper. The organic acids are described as having sufficiently high molecular weights to yield metal salts that are soluble in the polymer blends.

While these references describe various degradable polymers, they do not address problems related to providing extrudable elastomeric materials that will withstand severe processing conditions and, once incorporated into a product, will survive environments that could cause the polymer to chemically break down, and yet will still break down under typical compost conditions.

DEFINITIONS

The term "elastic" is used herein to mean any material which, upon application of a biasing force, is stretchable, that is, elongatable, to a stretched, biased length which is at least about 125 percent of its relaxed unbiased length, and which, will recover at least 40 percent of its elongation upon release of the stretching, elongating force. A hypothetical example would be a one (1) inch sample of a material which is elongatable to at least 1.25 inches and which, upon being elongated to 1.25 inches and released, will recover to a length of not more than 1.10 inches. Many elastic materials may be elongated by much more than 25 percent (i.e., much more than 125 percent of their relaxed length), for example, elongated 200 percent or more, and many of these will recover to substantially their initial relaxed length, for example, to within 105 percent of their initial relaxed length, upon release of the stretching force.

As used herein, the term "nonelastic" refers to any material which does not fall within the definition of "elastic," above.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches, the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length−final sample length)/(maximum stretch length−initial sample length)]×100.

As used herein, the term "sheet" refers to a layer which may either be a film or a nonwoven web.

As used herein, the term "nonwoven web" means a web having a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "microfibers" means small diameter fibers having an average diameter not greater than about 100 microns, for example, having an average diameter of from about 0.5 microns to about 50 microns, or more particularly, microfibers may have an average diameter of from about 4 microns to about 40 microns.

As used herein, the term "degrade" refers to a decrease or reduction in one or more physical properties of a material sample. One physical property that is used to characterize the degradation of a sample is the tensile energy absorbed during extension of the elastic sheet to about 250 percent (i.e., about 350 percent of its initial length). This measurement may be made utilizing a constant rate of extension tester such as, for example, the Sintech 2 computerized system for material testing available from Sintech, Inc., of Stoughton, Mass. For the present invention a material is considered to have degraded when the tensile energy absorbed measured at 250 percent extension for a sample exposed to a particular environment is less than about 50 percent of the tensile energy absorbed measured for an identical control sample.

As used herein, the term "thermally oxidative environment" refers to aerobic compost conditions in which the temperature is at or above 55° C. Such conditions are typically present in aerobic composting systems employing vessels and/or windrows, systematic aeration, and hydration. The essential aspects of this environment (i.e., heat and aerobic conditions) were reproduced in an air-circulating oven maintained at a temperature of at least 55° C.

As used herein, the term "continuous exposure" refers to essentially unbroken or incessant unprotected contact.

As used herein, the term "low degree of residual ethylenic unsaturation" refers to the residual ethylenic unsaturation content in the conjugated diene mid-block of an A-B-A' elastomeric block copolymer. Desirably, those polymers are hydrogenated to an essentially saturated rubber midblock. For example, the Kraton ® G series of rubbers available from the Shell Chemical Company of Houston, Tex., are A-B-A' elastomeric block copolymers described in trade literature as having an essentially olefinic midblock (i.e., a low level of residual ethylenic unsaturation). Other A-B-A' elastomeric block copolymers having a low degree of residual ethylenic unsaturation in the conjugated diene midblock are disclosed, for example, in U.S. Pat. No. 4,970,259, assigned to the Shell Oil Company of Houston, Tex. Typically, the residual ethylenic unsaturation content may be less than about 20 percent, for example, from less than 10 percent to even less than 5 percent, of the original ethylenic unsaturation content prior to hydrogenation.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, surfactants, waxes, flow promoters, particulates and materials added to enhance processability of the composition.

SUMMARY OF THE INVENTION

The present invention addresses the problems of the prior art by providing an extrudable elastomeric composition composed of (1) an elastomeric A-B-A' block copolymer where A and A' are each a thermoplastic polymer endblock and where B is a conjugated diene monomer unit having a low degree of residual ethylenic unsaturation; (2) a polyolefin; and (3) an effective amount of a transition metal compound that is substantially uniformly distributed in a blend of the polyolefin and block copolymer. This extrudable elastomeric composition is formulated so that it can be extruded into an elastic sheet which may be used to provide elasticity to a variety of products such as, for example, disposable personal care products. After normal use, the sheet is adapted to degrade after less than about 30 days continuous exposure to a thermally oxidative environment.

The active ingredient in the extrudable elastomeric composition of the present invention is a transition metal compound. It has been found that two transition metals are particularly effective in the extrudable elastomeric compositions of the present invention. Salts and complexes of the transition metals cobalt and manganese are particularly effective with the specific elastomeric block copolymers that are part of the extrudable composition. The salts of cobalt or manganese may be aliphatic carboxylic acid salts having about twelve to twenty two carbon atoms. Exemplary metal salts include cobalt stearate, cobalt oleate, manganese stearate, and manganese oleate.

If the transition metal compounds are in the form of transition metal complexes, the complexing agents should be able to readily combine at least with cobalt and/or manganese. Exemplary complexing agents include acetylacetonates, N,N'-bis(salicylidene)-1,2-alkanediamines, N,N'-bis(salicylidene)-1,3-alkanediamines and N,N'-bis(salicylidene)1,2-phenylenediamines and mixtures thereof. Exemplary metal complexes include cobalt(II) acetylacetonate, cobalt(III) acetylacetonate, manganese(II) acetylacetonate, manganese(III) acetylacetonate, N,N'-bis(salicylidene) ethylenediamino cobalt(II), and N,N'-bis(salicylidene) ethylenediaminomanganese(II).

Elastomeric A-B-A' block copolymers used in the extrudable composition contain a conjugated diene monomer midblock having a low degree of residual ethylenic unsaturation. Useful, A-B-A' block copolymers include, for example, styrene-poly(ethylene-propylene)-styrene and styrene-poly(ethylene-butylene)-styrene elastomeric block copolymers and mixtures of the same.

The polyolefin component of the extrudable composition may be polyethylene, polypropylene, polybutylene, ethylene copolymers, propylene copolymers, butylene copolymers and mixtures thereof.

These components are blended within the following ranges to form the extrudable elastomeric composition: from about 60 to about 99 percent, by weight, of an A-B-A' elastomeric block copolymer containing a conjugated diene monomer unit having a low degree of residual ethylenic unsaturation; from about 1 to about 40 percent, by weight, of a polyolefin; and from about 0.01 to about 0.1 percent, by weight, of the transition metal.

If desired, the extrudable elastomeric composition may also contain up to about 30 percent by weight of a tackifying resin. The tackifying resin may be added to the composition so it may be used to form an elastic pressure sensitive adhesive sheet. Useful tackifying resins include, for example, hydrogenated hydrocarbon resins and terpene hydrocarbon resins.

In one embodiment of the present invention, the extrudable composition may contain other ingredients which appear to work with the transition metal compounds in promoting degradation. For example, the extrudable elastomeric composition may contain from about 0.01 to about 0.15 percent, by weight, of an organic hydroperoxide. When combined with the transition metal compounds, the organic hydroperoxide appears to increase the rate at which an elastic sheet formed from the extrudable composition will degrade in a thermally oxidative environment. Useful organic hydroperoxides include, for example, 2,5-dimethylhexane-2,5-dihydroperoxide, cumene hydroperoxide, and t-butyl hydroperoxide.

The amount of transition metal in the extrudable composition may be varied within the general range given above. For example, the extrudable elastomeric composition may contain from about 0.015 to about 0.075 percent, by weight, of the transition metal. As a further example, the extrudable elastomeric composition may contain from about 0.02 to about 0.05 percent, by weight, of the transition metal. Likewise, if an organic hydroperoxide is added to the extrudable composition, the amount used may be varied within the general range given above. For example, the extrudable elastomeric composition may contain from about 0.02 to about 0.125 percent, by weight, of the organic hydroperoxide.

By varying the amounts of one or both of those ingredients, an elastic sheet made of the extrudable elastomeric composition may be adapted to degrade after even less than about 30 days continuous exposure to a thermally oxidative environment. For example, an elastic sheet made of the extrudable elastomeric composition may be adapted to degrade after less than about 20 days, or even less than about 10 days continuous exposure to a thermally oxidative environment.

The extrudable elastomeric composition may be formed into an elastic sheet by film extrusion processes and film blowing processes. The composition may also be formed into an elastic nonwoven sheet by collecting melt-spun fibers or filaments into a coherent web. Such fibers or filaments may be formed by processes such as, for example, melt-blowing processes. Meltblown fibers from such processes may include melt-blown microfibers.

In one embodiment of the present invention, meltblown fibers are formed by extruding the composition through an array of small diameter capillaries as molten threads into a gas stream. The gas stream attenuates the molten threads into a gas-borne stream of meltblown fibers and/or microfibers. Particulates and/or other fibrous material may be added to the gas stream in which the meltblown fibers are carried so that an intimately entangled mingling of meltblown fibers and other materials occurs prior to the collection of the meltblown fibers upon a collecting device to form a coherent web of randomly dispersed meltblown fibers and other materials, if any, which may have been added.

According to the present invention, such a composite web of elastomeric meltblown fibers and other materials may contain at least about 20 percent, by weight, meltblown fibers and from greater than about 0 percent, by weight, up to about 80 percent, by weight of at least one other material. The other material may be for example, woody and non-woody pulp, cellulosic fibers, natural fibers, or particulates.

In another embodiment of the present invention, an elastic sheet of the extrudable elastomeric composition may be incorporated into an elastic composite material such as, for example, a stretch-bonded laminate as disclosed in U.S. Pat. No. 4,720,415.

DETAILED DESCRIPTION OF THE INVENTION

Figure 1:
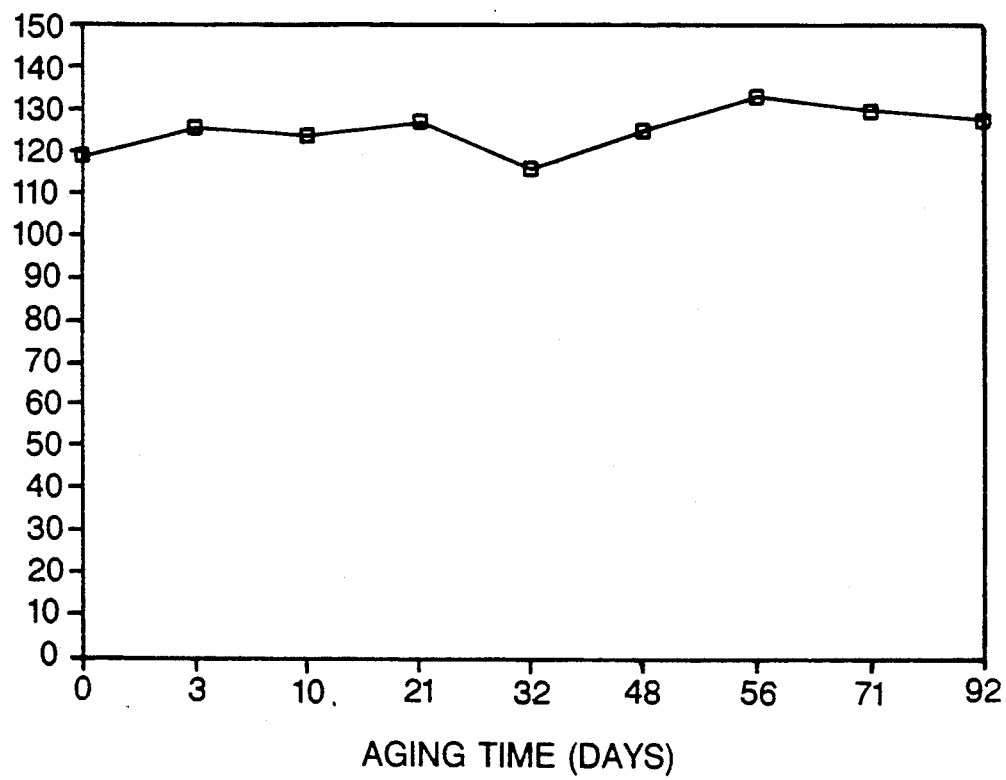
FIG. 1 is an exemplary curve showing the tensile energy absorbed versus aging time for an elastic nonwoven web of meltblown fibers formed from an extrudable elastomeric composition with no added transition metal compounds or hydroperoxides.

The extrudable elastomeric composition of the present invention contains at least three components: (1) an elastomeric A-B-A' block copolymer that includes a conjugated diene monomer midblock having a low degree of residual ethylenic unsaturation; (2) a polyolefin; and (3) an effective amount of a transition metal compound which is substantially uniformly distributed in a blend of the polyolefin and block copolymer.

When small amounts of certain transition metals such as, for example, cobalt and/or manganese are added to the extrudable elastomeric compositions of the present invention, elastic sheets made from those compositions have degraded within a specified period of continuous exposure to a thermally oxidative environment. This is important because those extrudable compositions contain a major portion of an A-B-A' elastomeric block copolymer having a conjugated diene mid-block with a low degree of residual unsaturation. Typically, those elastomeric block copolymers tend to be relatively stable, even in many thermally oxidative environments.

Transition metals such as, for example, cobalt and/or manganese are added to the extrudable elastomeric compositions in the form of transition metal salts and/or complexes. The transition metal salts may be aliphatic carboxylic acid salts having about twelve to twenty two carbon atoms. Exemplary aliphatic carboxylic acids include stearates and oleates. Those acids may be combined with cobalt or manganese to form, for example, cobalt oleate, cobalt stearate, manganese oleate, and manganese stearate. Individual salts or mixtures of salts may be added to the extrudable compositions.

For example, one useful transition metal salt obtained from the Mooney Chemicals, Incorporated of Cleveland, Ohio is cobalt(II) stearate. This cobalt(II) stearate is described in Mooney Chemicals' product information as cobalt stearate, MFG Code 131. Typical properties reported in the product information are as follows: (1) contains about 9.5 percent, by weight, cobalt, (2) softening point of 92° Centigrade, (3) solid at room temperature, (4) Specific Gravity, approximately 1.10, and (4) purple in appearance. Other useful transition metal salts include, for example, manganese(II) stearate, obtained from the Shepherd Chemical Company of Cincinnati, Ohio.

The transition metal complexes may be added to the extrudable composition individually, in mixtures, or in combination with the transition metal salts. Useful complexing agents include, for example, acetylacetonates, N,N'-bis(salicylidene)-1,2-alkanediamines, N,N'-bis(salicylidene)-1,3-alkanediamines and N,N'-bis(salicylidene)1,2-phenylenediamines and mixtures thereof. Exemplary transition metal complexes include cobalt(III) acetylacetonate, N,N'-bis(salicylidene) ethylenediaminocobalt(II), manganese(III) acetylacetonate, and N,N'-bis(salicylidene) ethylenediamino manganese(II), cobalt(II) acetylacetonate and manganese(II) acetylacetonate.

For example, one useful transition metal complex obtained from the Shepherd Chemical Company of Cincinnati, Ohio is cobaltic acetylacetonate (i.e., cobalt-(III) acetylacetonate) . Information supplied by the Shepherd Chemical Company describes the cobalt(III) acetylacetonate as follows: (1) contains about 16.3 to about 17 percent, by weight, cobalt, (2) moisture content 0.5 percent, maximum, (3) insoluble in methylene chloride, about 1.0 percent solubility, maximum, (4) melting point of 510° Fahrenheit, (5) Specific Gravity of about 1.7, ($H_2O=1$), and (6) greenish-black in appearance. Another useful transition metal complex from the same source is cobaltous acetylacetonate (i.e., cobalt(II) acetylacetonate) which is described as follows: (1) contains about 20.6 percent, by weight, cobalt, (2) negligible solubility in water, (3) melting point of about 290° Fahrenheit, (4) Specific Gravity of about 1.5, ($H_2O=1$), and (5) bluish-red in appearance. Other useful transition metal complexes obtained from the Shepherd Chemical Company include, for example, manganic acetylacetonate (i.e., manganese(III) acetylacetonate); and manganese(II) acetylacetonate. An exemplary transition metal complex obtained from the Aldrich Chemical Company is N,N'-bis(salicylidene) ethylenediamino cobalt(II).

The transition metal salt and/or complex should be distributed as uniformly as practical in the blend of the block copolymer and polyolefin. For example, the transition metal compound may be very finely divided or even soluble in the blend of polymers. A substantially uniform distribution of the transition metal compound helps avoid concentrations or "hot spots" of the transition metal within the extrudable composition. Substantially uniform distribution of the transition metal compound also eases processing of the extrudable elastomeric compositions and promotes a more controlled degradation of sheets made from the extrudable compositions.

The elastomeric block copolymer component of the extrudable elastomeric composition is an A-B-A' block copolymer where A and A' are each a thermoplastic polymer endblock and where B is a conjugated diene monomer unit having a low degree of residual ethylenic unsaturation. These elastomeric block copolymers are hydrogenated to increase their thermal stability and resistance to oxidation. The copolymers are hydrogenated in a manner that is believed to achieve an essentially saturated olefin mid-block. The residual ethylenic unsaturation content in the conjugated diene mid-block is typically less than about 20 percent, for example, from less than 10 percent to even less than 5 percent, of their original ethylenic unsaturation content prior to hydrogenation. Exemplary A-B-A' elastomeric block copolymers having low levels of residual ethylenic unsaturation are the Kraton ® G series of rubbers available from the Shell Chemical Company of Houston, Tex. For example, Kraton ® G 1657 has a low level of residual ethylenic unsaturation and is described in trade literature as having an essentially olefinic midblock.

Other A-B-A' elastomeric block copolymers having a low degree of residual ethylenic unsaturation in the conjugated diene mid-block are disclosed, for example, in U.S. Pat. No. 4,970,259, assigned to the Shell Oil Company of Houston, Tex.

Desirably, these elastomeric block copolymers should contain only the minimum amount of stabilizers and/or anti-oxidants, if any, required for safe storage, handling and/or processing. For example, one sample of Kraton ® G-1657 was reported by the Shell Chemical Company to contain about 0.042 percent, by weight, of an antioxidant.

The polyolefin which may be utilized in the extrudable composition must be one which, when blended with the elastic block copolymer or a mixture of elastomeric block copolymers and subjected to an appropriate combination of elevated pressure and elevated temperature conditions, is extrudable, in blended form, with the elastomeric block copolymer or mixture of elastomeric block copolymers. In particular, useful polyolefin materials include polyethylene, polypropylene and polybutylene, including polyethylene copolymers, polypropylene copolymers and polybutylene copolymers. Blends of two or more of the polyolefins may be utilized.

One particular polyethylene may be obtained from U.S.I. Chemical Company under the trade designation Petrothene NA 601-00 (also referred to herein as PE NA 601-00). Information obtained from U.S.I. Chemical Company states that PE NA 601-00 is a low molecular weight, low density polyethylene for application in the areas of hot melt adhesives and coatings. U.S.I. has indicated that PE NA 601-00 contains a relatively low level of stabilizers and/or anti-oxidants, generally about 0.01 to about 0.02 percent, by weight (100 to 200 parts per million) butylated hydroxytoluene (BHT); a specific gravity of about 0.910 to about 0.925 grams per cubic centimeter; and a melting point ranging from about 100° to about 115° Centigrade. Other properties for PE NA 601-00 generally correspond to the following nominal values reported by U.S.I. for PE NA 601-4 (its polyethylene having greater levels of stabilizers and/or anti-oxidants): (1) a Brookfield viscosity, cP at 150 degrees Centigrade of 8,500 and at 190 degrees Centigrade of 3,300 when measured in accordance with ASTM D 3236; (2) an equivalent melt index of 2,000 grams per 10 minutes when measured in accordance with ASTM D 1238; (3) a ring and ball softening point of 102 degrees Centigrade when measured in accordance with ASTM E 28; (4) a tensile strength of 850 pounds per square inch when measured in accordance with ASTM D 638; (5) an elongation of 90% when measured in accordance with ASTM D 638; (6) a modulus of rigidity, $T_f(45,000)$ of $-34$ degrees Centigrade; and (7) a penetration hardness (tenths of Mm) at 77 degrees Fahrenheit of 3.6.

Of course, the present invention is not limited to use of such specific polyolefins described herein. In this regard, note the polyolefins as described in U.S. Pat. Nos. 4,663,220 and 4,789,699, the contents of which are incorporated herein by reference. More generally, and noting the specific purpose of the polyolefin, as described in the U.S. Pat. No. 4,663,220, various polyolefins which can be utilized in the present invention can easily be determined.

At least these three components (i.e., the A-B-A' block copolymer, polyolefin, and transition metal compound) are blended together to form the extrudable elastomeric composition of the present invention. The components are blended in at least the following general ranges: from about 60 to about 99 percent, by weight, of the A-B-A' elastomeric block copolymer where A and A' are each a thermoplastic polymer endblock and where B is a conjugated diene monomer unit having a low degree of residual ethylenic unsaturation; from about 1 to about 40 percent, by weight, of a polyolefin; and from about 0.01 to about 0.1 percent, by weight, of the transition metal. Desirably, the transition metal may be present in the amount of from about 0.015 to about 0.075 percent, by weight. For example, the transition metal may be present in the amount of from about 0.02 to about 0.05 percent, by weight.

If desired, various tackifying resins may be used in the present invention. For example, the extrudable composition may contain up to about 30 percent, by weight, of a tackifying resin. In particular, the purpose of the tackifying resin is to provide an elastic web that can act as a pressure sensitive adhesive, e.g., to bond the elastic sheet to a gatherable web. Of course, various tackifying resins are known, and are discussed, e.g., in U.S. Pat. Nos. 4,789,699, 4,294,936 and 3,783,072, the contents of which, with respect to the tackifier resins, are incorporated herein by reference. Any tackifier resin can be used which is compatible with the elastic polymer and the polyolefin, and can withstand the high processing (e.g., extrusion) temperatures. Generally, hydrogenated hydrocarbon resins are preferred tackifying resins, because of their better temperature stability.

In the following paragraphs are disclosed information on two specific tackifying resins. Regalrez ® series tackifiers are examples of hydrogenated hydrocarbon resins and ZONATAC®501 LITE is an example of a terpene hydrocarbon resin. Of course, while those two tackifying resins are specifically discussed, the present invention is not limited to use of those particular tackifying resins, and other tackifying resins which are compatible with the other components of the composition and can withstand the high processing temperatures, and can achieve the objectives of the present invention, can also be used.

Regalrez ® hydrocarbon resins, products of Hercules, Incorporated, are fully hydrogenated 60 -methyl styrene-type low molecular weight hydrocarbon resins, produced by polymerization and hydrogenation of pure monomer hydrocarbon feed stocks. Grades 1094, 3102, 6108 and 1126 are highly stable, light-colored low molecular weight, nonpolar resins suggested for use in plastics modification, adhesives, coatings, sealants and caulks. The resins are compatible with a wide variety of oils, waxes, alkyds, plastics and elastomers and are soluble in common organic solvents.

ZONATAC®501 lite resin, a product of Arizona Chemical Co., has a softening point of 105° C., a Gardner color 1963 (50% in heptane) of 1—and a Gardener color neat (pure) of 2+; a color [approximate Gardner color equal to 1—(50% in heptane); APHA color=70] of water white, a specific gravity (25°/25° C.) of 1.02 and a flash point (closed cup) of 480° F.

In addition to transition metal compounds, the extrudable elastomeric composition of the present invention may contain small amounts of one or more organic hydroperoxide compounds to help promote the controlled polymer degradation. It is contemplated that combinations of various transition metals and organic hydroperoxides may be equally effective or even superior to the two transition metals, cobalt and/or manganese, that have performed well in tests of controlled polymer degradation. Useful organic hydroperoxides include, for example, 2,5-dimethylhexane-2,5-dihydroperoxide, cumene hydroperoxide, and t-butyl hydroperoxide. For example, one useful organic hydroperoxide was obtained from Atochem North America of Buffalo, N.Y. under the tradename Luperox 2,5-2,5. Information supplied by Atochem North America indicates that Luperox 2,5-2,5 contains approximately 70 percent, by weight, 2,5-dimethylhexane-2,5-dihydroperoxide and approximately 30 percent, by weight, water. Luperox 2,5-2,5 is also described as being a white, granular solid having a melting point of about 102° Centigrade.

The organic hydroperoxide should be substantially uniformly distributed or be soluble in a blend of the block copolymer and polyolefin. This is desirable because a substantially uniform distribution of the organic hydroperoxide avoids concentrations or "hot spots" of the hydroperoxide within the extrudable composition and products formed thereof.

Less reactive hydroperoxide compounds are believed to be more desirable because they are more likely to survive severe processing conditions intact and remain available to promote degradation upon continuous exposure to a thermally oxidative environment. The extrudable composition may contain from about 0.01 to about 0.15 percent, by weight, of the organic hydroperoxide compound. Desirably, the organic hydroperoxide compound may be present in the amount of from about 0.02 to about 0.125 percent, by weight. For example, the organic hydroperoxide compound may be present in the amount of from about 0.04 to about 0.1 percent, by weight.

Turning now to the figures, and in particular to FIG. 1, there is shown an exemplary curve of the tensile energy absorbed versus aging time for an elastic nonwoven web of meltblown fibers formed from an extrudable elastomeric composition with no added transition metal compounds or hydroperoxides. This nonwoven web was formed on conventional meltblowing equipment from an extrudable composition containing about 63 percent, by weight, Kraton ® G 1657 elastomeric block copolymer (having about 0.042%, by weight, anti-oxidant), about 20 percent, by weight, PE NA 601-00 polyethylene, and about 17 percent, by weight, Regalrez ® tackifying resin. The resulting elastic meltblown fiber web was measured to have a basis weight of about 76 grams per square meter (gsm). The results of air-circulating oven aging at 55° Centigrade (i.e., a thermally oxidative environment) indicate that samples cut from the web did not degrade.

Figure 2:
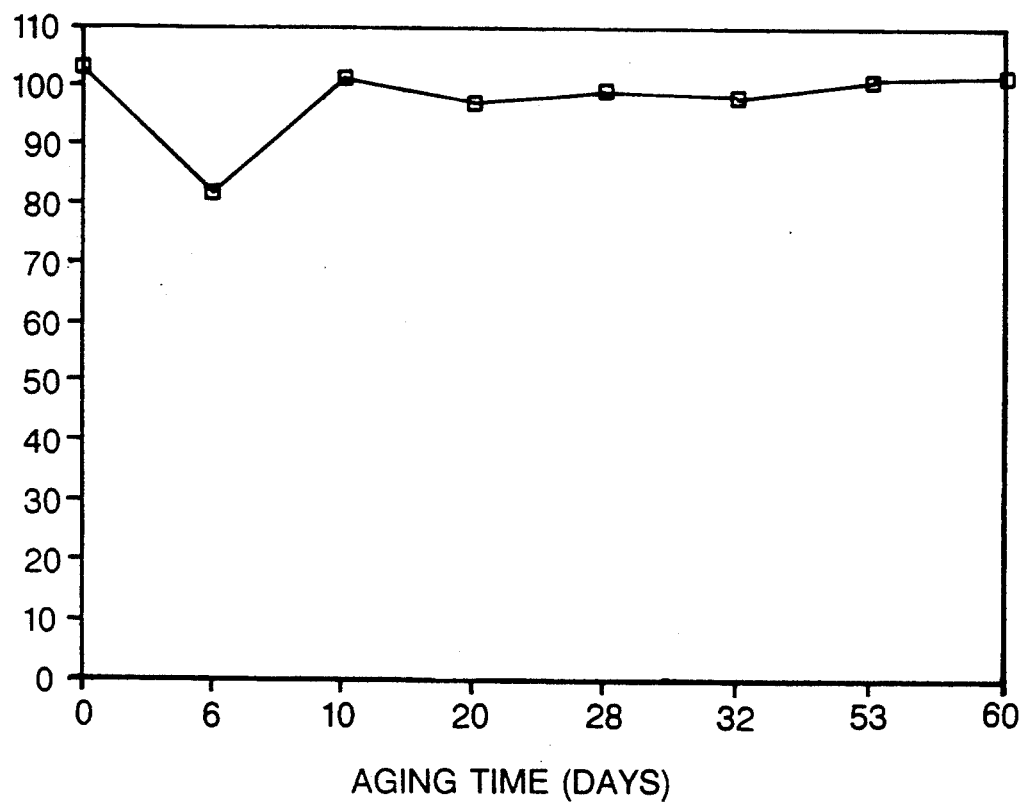
FIG. 2 is an exemplary curve showing the tensile energy absorbed versus aging time for an elastic nonwoven web of meltblown fibers formed from an extrudable elastomeric composition containing only added hydroperoxide.

FIG. 2 is an exemplary curve of tensile energy absorbed versus aging time for an elastic nonwoven web of meltblown fibers formed from an extrudable elastomeric composition containing only added organic hydroperoxide. This nonwoven web was identical to the one tested for FIG. 1 except that it had a basis weight of about 69 gsm and contained approximately 0.05 percent, by weight, Luperox 2,5-2,5 organic hydroperoxide. The results of air-circulating oven aging at 55° Centigrade indicate that, at the added level of organic hydroperoxide, samples cut from the web did not degrade.

Figure 3:
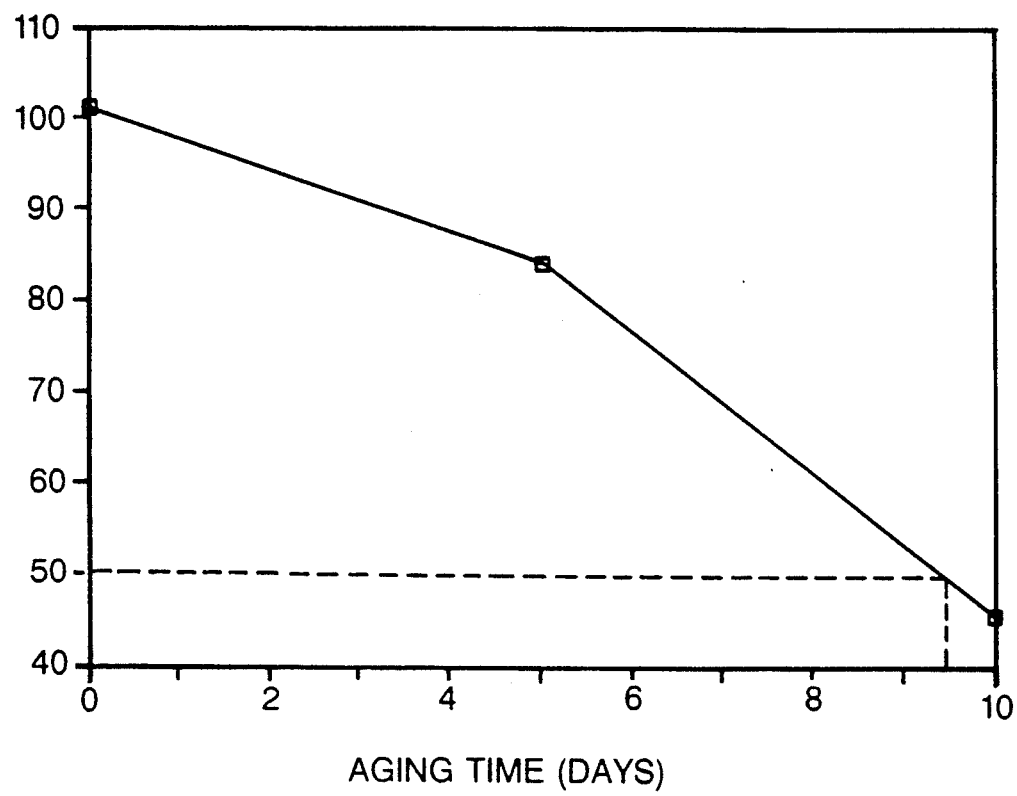
FIG. 3 is an exemplary curve showing the tensile energy absorbed versus aging time for an elastic nonwoven web of meltblown fibers formed from an extrudable elastomeric composition containing a transition metal compound.

FIG. 3 is an exemplary curve showing the tensile energy absorbed versus aging time for an elastic nonwoven web of meltblown fibers formed from an extrudable elastomeric composition containing cobalt(II) stearate. This nonwoven web was identical to the one tested for FIG. 1 except that it had a basis weight of about 76 gsm and contained approximately 0.038 percent, by weight, (i.e., 377 parts per million) of cobalt(II). The results of air-circulating oven aging at 55° Centigrade indicate that, at the added level of cobalt(II) stearate, samples cut from the web degraded in under 10 days.

Figure 4:
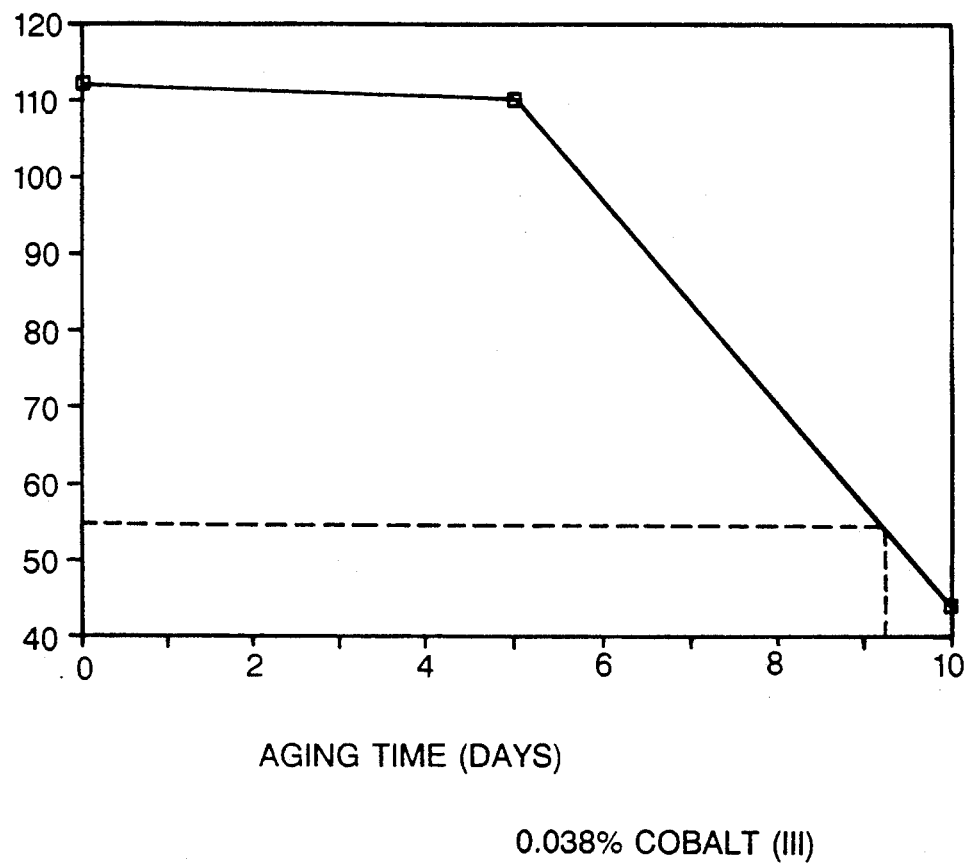
FIG. 4 is an exemplary curve showing the tensile energy absorbed versus aging time for an elastic nonwoven web of meltblown fibers formed from an extrudable elastomeric composition containing a transition metal compound.

FIG. 4 is an exemplary curve showing the tensile energy absorbed versus aging time for an elastic nonwoven web of meltblown fibers formed from an extrudable elastomeric composition containing cobalt(III) acetylacetonate. This nonwoven web was identical to the one tested for FIG. 1 except that it had a basis weight of about 74 gsm and contained approximately 0.038 percent, by weight, (i.e., 377 parts per million) of cobalt-(III). The results of air-circulating oven aging at 55° Centigrade indicate that, at the added level of cobalt- (III) acetylacetonate, samples cut from the web degraded in under 10 days.

Figure 5:
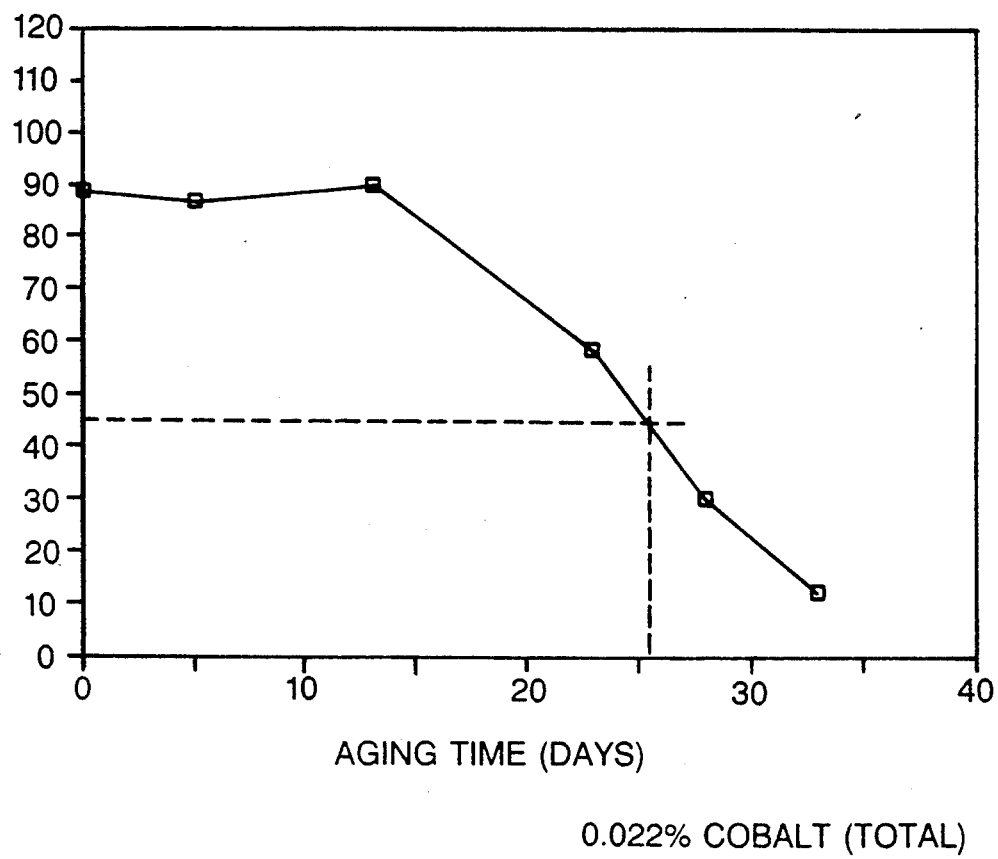
FIG. 5 is an exemplary curve showing the tensile energy absorbed versus aging time for an elastic nonwoven web of meltblown fibers formed from an extrudable elastomeric composition containing two transition metal compounds.

FIG. 5 is an exemplary curve showing the tensile energy absorbed versus aging time for an elastic nonwoven web of meltblown fibers formed from an extrudable elastomeric composition containing cobalt(II) stearate and cobalt(III) acetylacetonate. This nonwoven web was identical to the one tested for FIG. 1 except that it had a basis weight of about 66 gsm and contained approximately 0.0075 percent, by weight, (i.e., 75 parts per million) of cobalt(II) and approximately 0.015 percent, by weight, (i.e., 150 parts per million) cobalt(III) for a total measured cobalt content of about 0.022 percent, by weight (222 parts per million). The results of air-circulating oven aging at 55° Centigrade indicate that, at the added level of cobalt, samples cut from the web degraded in approximately 26 days.

Figure 6:
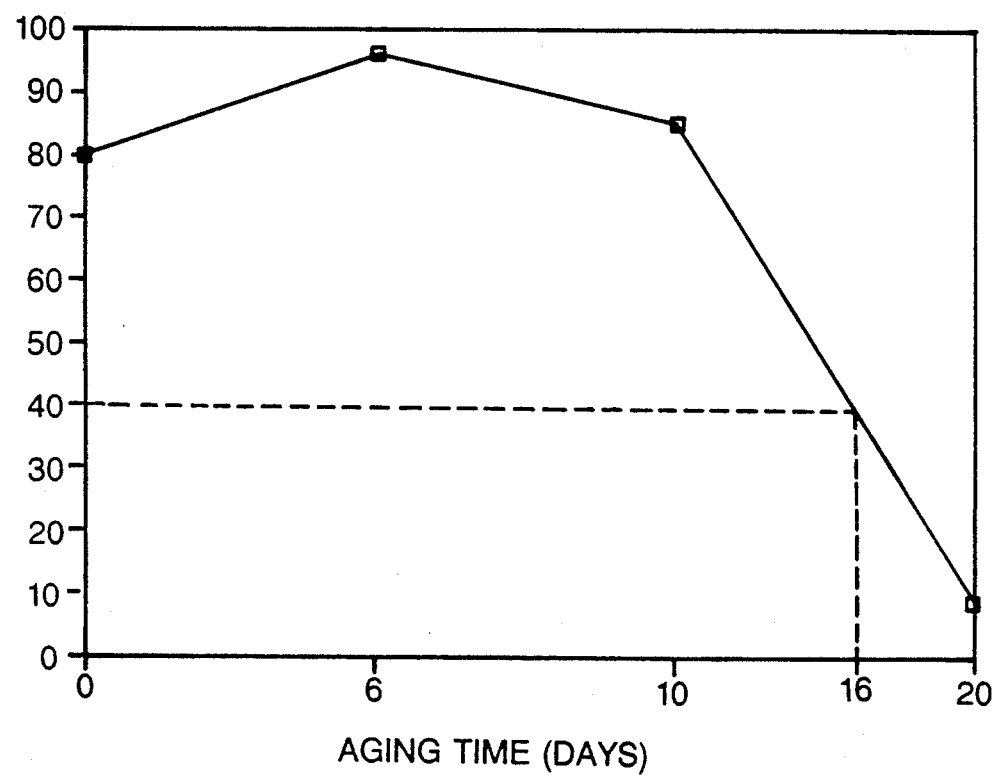
FIG. 6 is an exemplary curve showing the tensile energy absorbed versus aging time for an elastic nonwoven web of meltblown fibers formed from an extrudable elastomeric composition containing two transition metal compounds and a hydroperoxide.

FIG. 6 is an exemplary curve showing the tensile energy absorbed versus aging time for an elastic nonwoven web of meltblown fibers formed from an extrudable elastomeric composition containing cobalt(II) stearate and cobalt(III) acetylacetonate and an organic hydroperoxide. This nonwoven web was approximately the same as the one tested for FIG. 5 except that it contained approximately 0.05 percent, by weight, Luperox 2,5-2,5 organic hydroperoxide and had a measured total cobalt content of about 0.023 percent, by weight (223 parts per million). The results of air-circulating oven aging at 55° Centigrade indicate that, at the added level of cobalt and organic hydroperoxide, samples cut from the web degraded in approximately 16 days.

Figure 7:
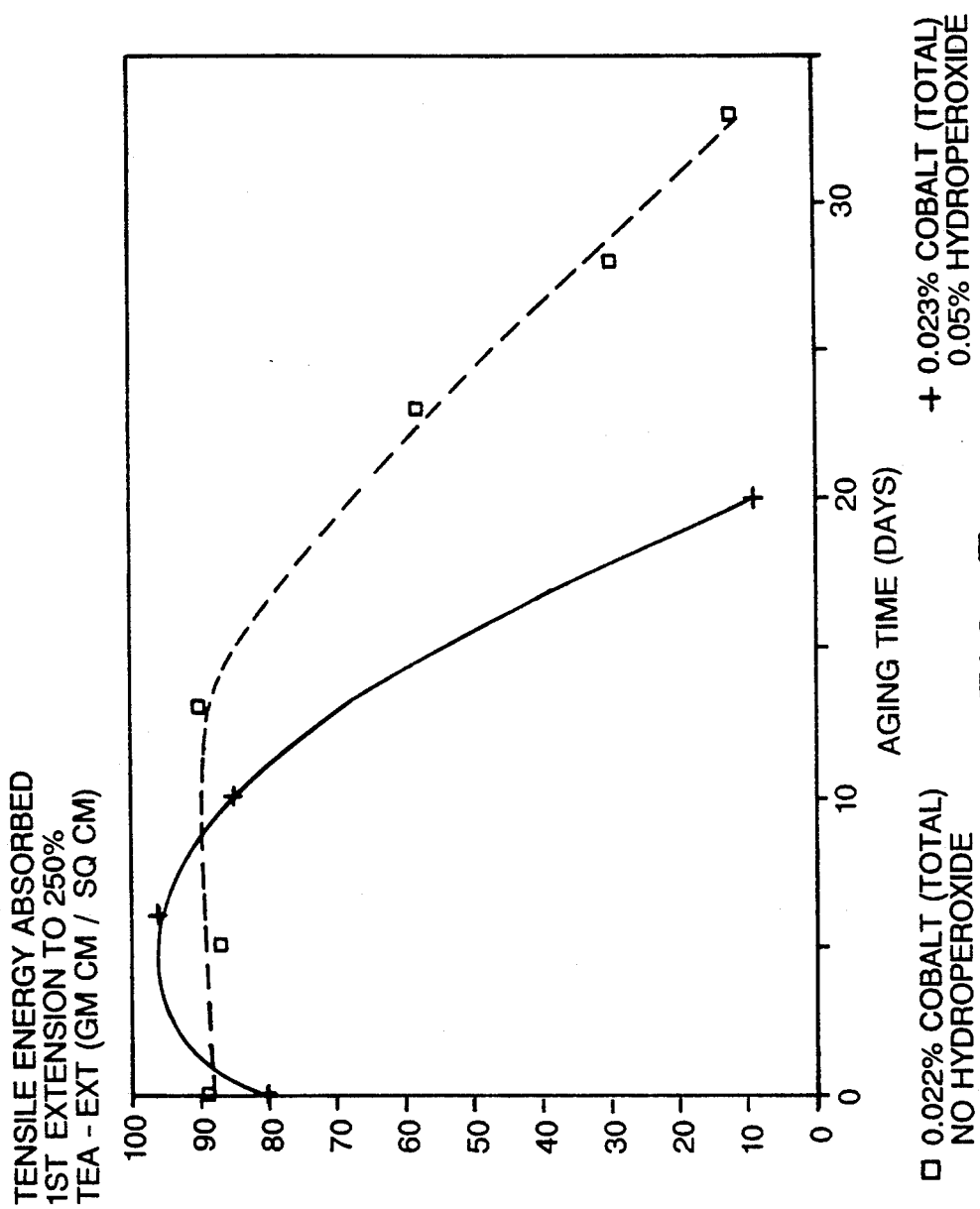
FIG. 7 is a comparison of the curves of FIGS. 5 and 6 showing the tensile energy absorbed versus aging time.

FIG. 7 is a comparison of the curves of FIGS. 5 and 6. As can be seen from the graph of tensile energy absorbed versus aging time, the addition of an organic hydroperoxide to a composition containing a transition metal appears to reduce the aging time needed to achieve degradation.

Figure 8:
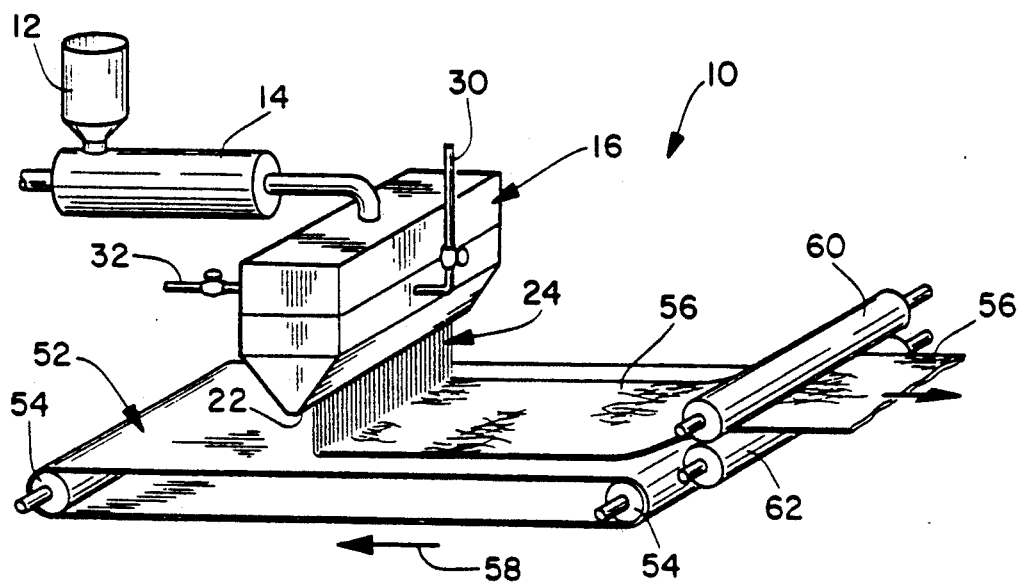
FIG. 8 is a schematic illustration of an apparatus, including a meltblowing die, which may be utilized to form the elastic nonwoven web of the present invention.

Turning again to the figures, and in particular to FIG. 8, wherein like reference numerals represent the same or equivalent structure, it can be seen that an apparatus for forming an elastic nonwoven web of the extrudable elastomeric compositions of present invention is schematically generally represented by reference numeral 10. In forming the elastic nonwoven web, pellets or chips, etc.(not shown) of the extrudable elastomeric composition of the present invention are introduced into a pellet hopper 12 of an extruder 14.

The extruder 14 has an extrusion screw (not shown) which is driven by a conventional drive motor (not shown). As the extrudable elastomeric composition advances through the extruder 14, due to rotation of the extrusion screw by the drive motor, it is progressively heated to a molten state. Heating of the elastomeric composition to the molten state may be accomplished in a plurality of discrete steps with its temperature being gradually elevated as it advances through discrete heating zones of the extruder 14 toward a meltblowing die 16. The die 16 may be yet another heating zone where the temperature of the thermoplastic resin is maintained at an elevated level for extrusion. The temperature which will be required to heat the extrudable elastomeric composition to a molten state will vary somewhat depending upon the various components utilized and can be readily determined by those skilled in the art. However, generally speaking, the extrudable elastomeric composition may be extruded within the temperature range of from about 450 degrees Fahrenheit to about 550 degrees Fahrenheit. For example, the extrusion may be accomplished within a temperature range of from about 475 degrees Fahrenheit to about 500 degrees Fahrenheit. Heating of the various zones of the extruder 14 and the meltblowing die 16 may be achieved by any of a variety of conventional heating arrangements (not shown).

Figure 9:
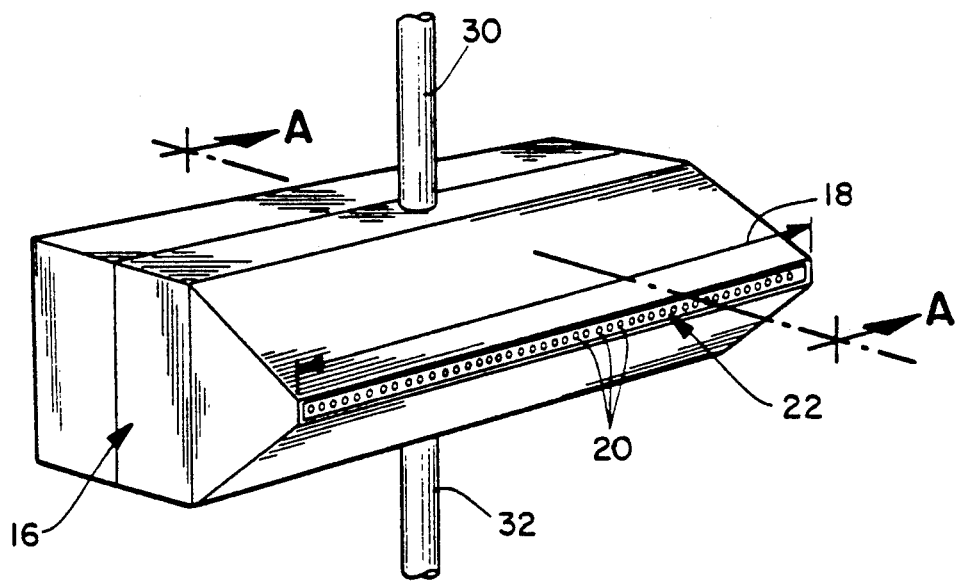
FIG. 9 is a bottom view of the die of FIG. 8 with the die having been rotated 90 degrees for clarity.

FIG. 9 illustrates that the lateral extent 18 of the die 16 is provided with a plurality of orifices 20 which are usually circular in cross-section and are linearly arranged along the extent 18 of the tip 22 of the die 16. The orifices 20 of the die 16 may have diameters that range from about 0.01 of an inch to about 0.02 of an inch and a length which may range from about 0.05 inches to about 0.20 inches. For example, the orifices may have a diameter of about 0.0145 inch and a length of about 0.113 inch. From about 5 to about 50 orifices may be provided per inch of the lateral extent 18 of the tip 22 of the die 16 with the die 16 extending from about 20 inches to about 60 inches or more. FIG. 8 illustrates that the molten extrudable elastomeric composition of the present invention emerges from the orifices 20 of the die 16 as molten strands or threads 24.

Figure 10:
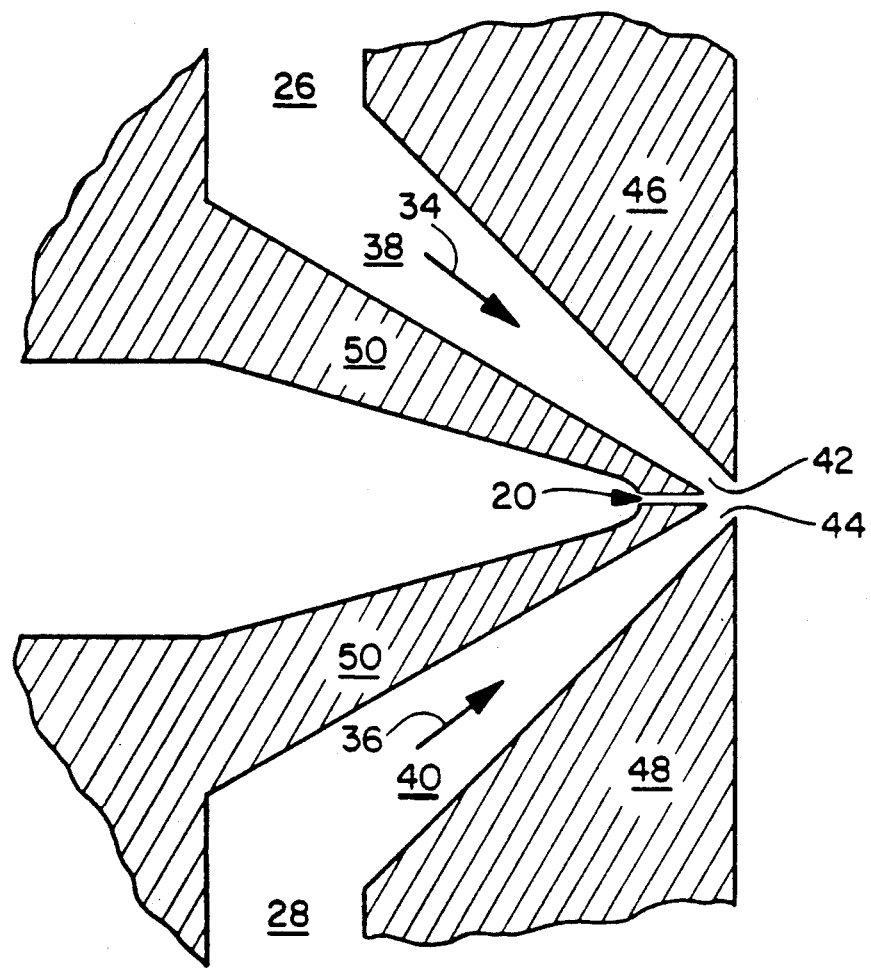
FIG. 10 is a cross-sectional view of the die of FIG. 9 taken along line A-A' of FIG. 9.

FIG. 10, which is a cross-sectional view of the die of FIG. 9 taken along line A-A', illustrates that the die 16 preferably includes attenuating gas inlets 26 and 28 which are provided with heated, pressurized attenuating gas (not shown) by attenuating gas sources 30 and 32. (See FIGS. 8 and 9). The heated, pressurized attenuating gas enters the die 16 at the inlets 26 and 28 and follows a path generally designated by the arrows 34 and 36 through the two chambers 38 and 40 and on through the two narrow passageways or gaps 42 and 44 so as to contact the extruded threads 24 as they exit the orifices 20 of the die 16. The chambers 38 and 40 are designed so that the heated attenuating gas passes through the chambers 38 and 40 and exits the gaps 42 and 44 to form a stream (not shown) of attenuating gas which exits the die 16 on both sides of the threads 24. The temperature and pressure of the heated stream of attenuating gas can vary widely. For example, the heated attenuating gas can be applied at a temperature of from about 470 degrees Fahrenheit to about 580 degrees Fahrenheit, more particularly, from about 500 degrees Fahrenheit to about 550 degrees Fahrenheit. The heated attenuating gas may generally be applied at a pressure of from about 0.5 pounds per square inch, gauge to about 20 pounds per square inch, gauge. More particularly, from about 1 pound per square inch, gauge to about 5 pounds per square inch, gauge.

The position of air plates 46 and 48 which, in conjunction with a die portion 50 define the chambers 38 and 40 and the gaps 42 and 44, may be adjusted relative to the die portion 50 to increase or decrease the width of the attenuating gas passageways 42 and 44 so that the volume of attenuating gas passing through the air passageways 42 and 44 during a given time period can be varied without varying the velocity of the attenuating gas. Furthermore, the air plates 46 and 48 may be adjusted to effect a "recessed" die-tip configuration as illustrated in FIG. 9 or a positive die-tip 22 stick-out where the tip of die portion 50 protrudes beyond the plane formed by the plates 48. Generally speaking, a recessed die-tip configuration and attenuating gas pressures of less than 5 pounds per square inch, gauge are used in conjunction with air passageway widths, which are usually the same and are no greater in width than about 0.12 inches. Lower attenuating gas velocities and wider air passageway gaps are generally preferred if substantially continuous meltblown fibers or microfibers 24 are to be produced.

The two streams of attenuating gas converge to form a stream of gas which entrains and attenuates the molten threads 24, as they exit the orifices 20, into fibers or, depending upon the degree of attenuation, microfibers, of a small diameter which is usually less than the diameter of the orifices 20. The gas-borne fibers or microfibers 24 are blown, by the action of the attenuating gas, onto a collecting arrangement which, in the embodiment illustrated in FIG. 8, is a foraminous endless belt 52 conventionally driven by rollers 54. Other foraminous arrangements such as a rotating drum could be utilized. One or more vacuum boxes (not illustrated) may be located below the surface of the foraminous belt 52 and between the rollers 54. The fibers or microfibers 24 are collected as a coherent matrix of fibers on the surface of the endless belt 52 which is rotating as indicated by the arrow 58 in FIG. 8. The vacuum boxes assist in retention of the matrix on the surface of the belt 52. Typically the tip 22 of the die 16 is from about 6 inches to about 14 inches from the surface of the foraminous belt 52 upon which the fibers are collected. The thus-collected, entangled fibers or microfibers 24 are coherent and may be removed from the belt 52 as a self-supporting nonwoven web 56 by a pair of pinch rollers 60 and 62 which may be designed to press the fibers of the web 56 together to improve the integrity of the web 56.

The above-described meltblowing techniques and apparatus are discussed fully in U.S. Pat. No. 4,663,220, the contents of which have been previously incorporated herein by reference.

Figure 11:
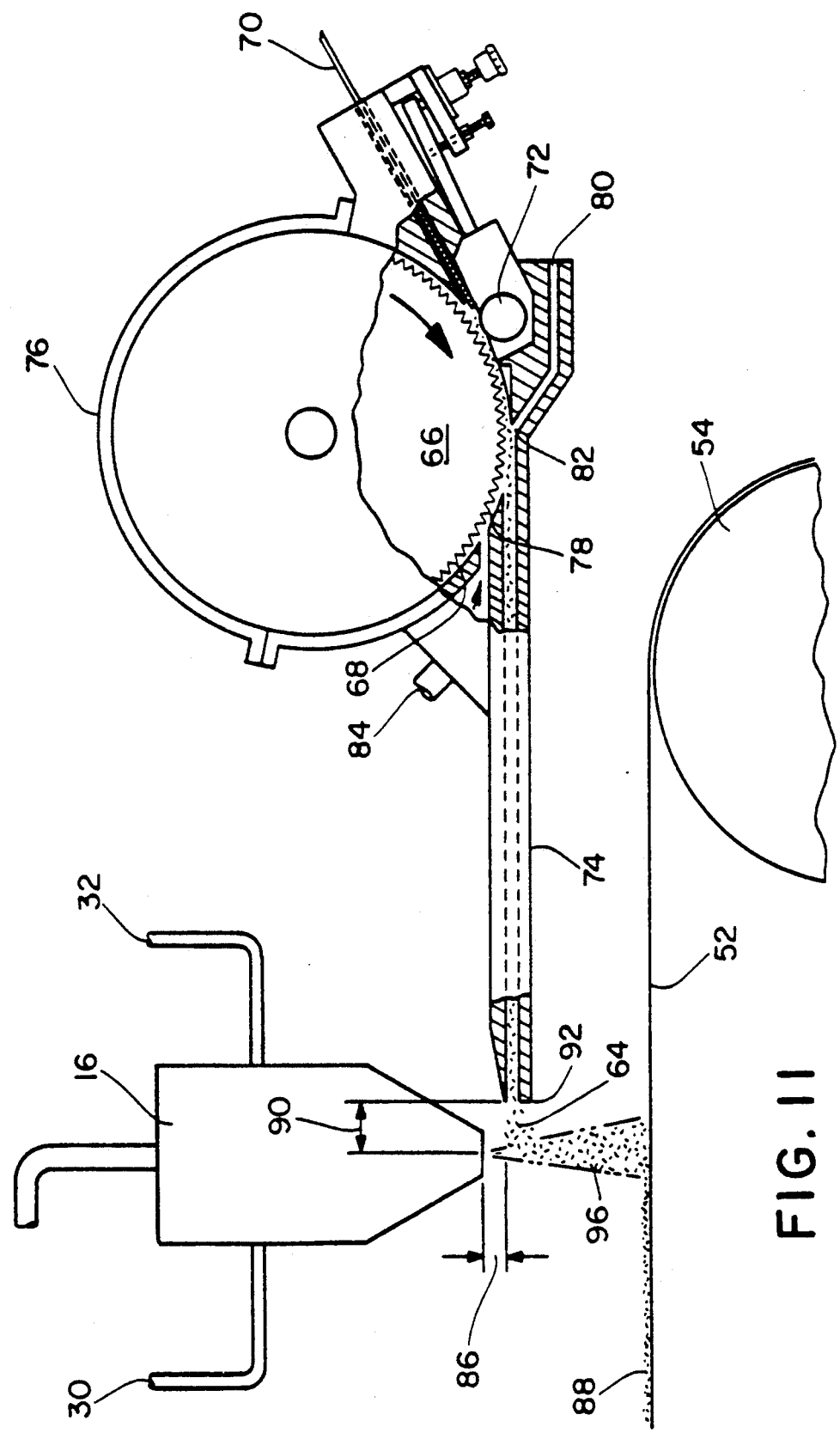
FIG. 11 is a schematic illustration of an apparatus which may be utilized to form the embodiment of the present invention where nonelastic fibers are incorporated into the matrix of meltblown fibers.

FIG. 11 illustrates an embodiment where one or more types of nonelastic fibers 64 are distributed within or upon the stream of thermoplastic fibers or microfibers 24. Distribution of the nonelastic fibers 64 within the stream of fibers 24 may be such that the nonelastic fibers 64 are generally uniformly distributed throughout the stream of extruded fibers 24. This may be accomplished by merging a secondary gas stream (not shown) containing the nonelastic fibers 64 with the stream of fibers 24. Apparatus for accomplishing this merger may include a conventional picker roll 66 arrangement which has a plurality of teeth 68 that are adapted to separate a mat or batt 70 of nonelastic fibers into the individual nonelastic fibers 64. The mat or batt of fibers 70 which is fed to the picker roll 66 may be a sheet of pulp fibers (if a two component mixture of elastomeric fibers and pulp fibers is desired), a mat of staple fibers (if a two component mixture of elastomeric fibers and staple fibers is desired) or both a sheet of pulp fibers and a mat of staple fibers (if a three component mixture of elastomeric fibers, staple fibers and pulp fibers is desired). In embodiments where, for example, an absorbent material is desired, the nonelastic fibers 64 are absorbent fibers. The nonelastic fibers 64 may generally be selected from the group including one or more fibers that break down under conventional compost conditions. For example, polyester fibers, cellulosic derived fibers such as, for example, rayon fibers and wood pulp fibers, natural fibers such as silk fibers, wool fibers or cotton fibers or blends of two or more of such fibers. Other types of materials such as, for example, superabsorbent particles and activated charcoal as well as blends of two or more of other types of fibers and/or materials may be utilized.

The sheets or mats 70 of nonelastic fibers 64 are fed to the picker roll 66 by a roller arrangement 72. After the teeth 68 of the picker roll 66 have separated the mat of nonelastic fibers 70 into separate nonelastic fibers 64 the individual nonelastic fibers 64 are conveyed toward the stream of extruded fibers or microfibers 24 through a nozzle 74. A housing 76 encloses the picker roll 66 and provides a passageway or gap 78 between the housing 76 and the surface of the teeth 68 of the picker roll 66. A gas (not shown), for example air, is supplied to the passageway or gap 78 between the surface of the picker roll 66 and the housing 76 by way of a gas duct 80. The gas duct 80 may enter the passageway or gap 78 generally at the junction 82 of the nozzle 74 and the gap 78. The gas is supplied in sufficient quantity to serve as a medium for conveying the nonelastic fibers 64 through the nozzle 74. The gas supplied from the duct 80 also serves as an aid in removing the nonelastic fibers 64 from the teeth 68 of the picker roll 66. However, gas supplied through the duct 84 generally provides for the removal of the nonelastic fibers 64 from the teeth of the picker roll 66. The gas may be supplied by any conventional arrangement such as, for example, an air blower (not shown).

Generally speaking, the individual nonelastic fibers 64 are conveyed through the nozzle 74 at generally the velocity at which the nonelastic fibers 64 leave the teeth 68 of the picker roll 66. In other words, the nonelastic fibers 64, upon leaving the teeth 68 of the picker roll 66 and entering the nozzle 74, generally maintain their velocity in both magnitude and direction from the point where they left the teeth 68 of the picker roll 66. Such an arrangement, which is discussed in more detail in U.S. Pat. No. 4,100,324 to Anderson et al., hereby incorporated by reference, aids in substantially reducing fiber floccing.

The picker roll 66 may be replaced by a conventional particulate injection system to form a composite nonwoven web 88 containing various particulates. A combination of both particulates and nonelastic fibers could be added to the elastic block copolymer fibers prior to formation of the composite nonwoven web 88 if a conventional particulate injection system was added to the system illustrated in FIG. 8. FIG. 8 further illustrates that the gas stream carrying the nonelastic fibers 64 is moving in a direction which is generally perpendicular to the direction of movement of the stream of extruded fibers 24 at the point of merger of the two streams. Other angles of merger of the two streams may be utilized. The velocity of the gas stream of nonelastic fibers 64 is usually adjusted so that it is less than the velocity of the stream of extruded fibers 24. This allows the streams, upon merger and integration thereof to flow in substantially the same direction as that of the stream of extruded fibers 24. Indeed, the merger of the two streams may be accomplished in a manner which is somewhat like an aspirating effect where the stream of nonelastic fibers 64 is drawn into the stream of elastomeric block copolymer fibers 24. If desired the velocity difference between the two gas streams may be such that the nonelastic fibers 64 are integrated into the extruded fibers 24 in a turbulent manner so that the nonelastic fibers 64 become substantially thoroughly and uniformly mixed throughout the extruded fibers 24. Generally, for increased production rates the gas stream which entrains and attenuates the stream of extruded fibers 24 should have a comparatively high initial velocity, for example from about 200 feet to over 1,000 feet per second, and the stream of gas which carries the nonelastic fibers 64 should have a comparatively low initial velocity, for example from about 50 to about 200 feet per second. After the stream of gas that entrains and attenuates the extruded fibers 24 exits the gaps 42 and 44 of the die 16, it immediately expands and decreases in velocity.

Upon merger and integration of the stream of nonelastic fibers 64 into the stream of extruded fibers 24 to generally uniformly distribute the nonelastic fibers 64 throughout the stream of extruded fibers 24, a composite stream 96 of thermoplastic fibers 22 and nonelastic fibers 64 is formed. Due to the fact that the extruded fibers 24 are usually still semi-molten and tacky at the time of incorporation of the nonelastic fibers 64 into the extruded fibers 24, the nonelastic fibers 64 are usually not only mechanically entangled within the matrix formed by the extruded fibers 24 but are also thermally bonded or joined to the extruded fibers 24. In order to convert the composite stream 96 of extruded fibers 24 and nonelastic fibers 64 into a composite elastic nonwoven web or mat 88 composed of a coherent matrix of the extruded fibers 24 having the nonelastic fibers 64 generally uniformly distributed therein, a collecting device is located in the path of the composite stream 96. The collecting device may be the endless belt 52 of FIG. 8, upon which the composite stream 96 impacts to form the composite nonwoven web 56. The belt 52 is usually porous, and a conventional vacuum arrangement (not shown) which assists in retaining the composite stream 96 on the external surface of the belt 52 is usually present. Other collecting devices are well known to those of skill in the art and may be utilized in place of the endless belt 52. For example, a porous rotating drum arrangement could be utilized. Thereafter the composite elastic nonwoven web 88 is removed from the screen by the action of rollers such as roller 60 and 62, shown in FIG. 8.

EXAMPLES

The elastic nonwoven sheets of examples A-G were made by meltblowing different extrudable elastomeric compositions containing one or more transition metal compounds and/or organic hydroperoxides.

Each extrudable composition is a blend of approximately 63 percent, by weight, Kraton ® G 1657 elastomeric block copolymer (having about 0.042%, by weight, anti-oxidant); about 20 percent, by weight, PE NA 601-00 polyethylene; and about 17 percent, by weight, Regalrez ® tackifying resin. Gram weights of one or more additives used in each blend were mixed with a 5 pound portion of the Regalrez ® tackifying resin using a small Henschel blender. The blender was rinsed with another 5 pound portion of the Regalrez ® tackifying resin. All the ingredients were dry blended using conventional thermoplastic resin mixing equipment and then formed into pellets utilizing a twin screw extruder and conventional under-water pelletizing equipment. The pellets were dusted with Microthene ™ FA 750-00 (low density polyethylene) dusting agent available from U.S.I. Chemicals Co. Of Tuscola, Ill.

Pelletized blends were added to the pellet hopper of a conventional meltblowing apparatus and the extrudable compositions were extruded through a meltblowing die having a staggered arrangement of 30 extrusion capillaries per lineal inch of die tip. The capillaries each had a diameter of about 0.018 inches and a length of about 0.144 inches. The elastomeric blend was passed through the capillaries at a rate of about 0.503 grams per capillary per minute at a temperature of about 480 degrees Fahrenheit. The extrusion pressure exerted upon the molten blend in the die tip was measured as 300 pounds per square inch, gauge. The die tip configuration was adjusted so that it was recessed about 0.148 inches from the plane of the external surface of the lips of the air plates which form the air passageways on either side of the capillaries providing a total air gap of about 0.12 inches. Forming air for meltblowing the blend was supplied to the air passageways at a temperature of about 500 degrees Fahrenheit and at a gauge pressure of about 0.9 pounds per square inch. The meltblown fibers thus formed were blown onto a forming screen which was approximately 14 inches from the die tip. The meltblown fibers were collected on the forming screen into coherent nonwoven webs.

A series of about fifty 6-inch by 3-inch samples were cut from each web. The samples were cut from the original web such that the axis of the sample in the direction of the 6 inch length was in the machine direction of the original web (i.e., the direction that the original web was carried as it was formed on the moving belt below the meltblowing die tip). The axis of the sample in the direction of the 3 inch width was in the cross-machine direction (i.e., perpendicular to the machine direction).

Sets of four samples, separated by silicone release paper and clipped to a cardboard strip, were hung from racks in an Blue M ® Stabil-Therm Mechanical Convection Oven model No. OV490A-3 available from Blue M (a unit of General Signal) of Blue Island, Ill. The oven was held at a temperature of 55° C. and air was circulated across the samples so that they fluttered lightly in the circulating air. Each set of four samples was attached to a cardboard strip. The sample adjacent the cardboard strip was not tested because the air circulation against that strip appeared to be different from the circulation for the other samples. Several samples were not placed in the oven to serve as a control for the experiment.

Grab tensile test data for oven aged samples and control samples were performed on a Sintech 2 computerized system for material testing available from Sintech, Inc., of Stoughton, Mass. The jaw faces of the tester were 1 inch by 3 inches. A three inch gauge length was used. Chart and crosshead speeds were set for about 500 millimeters/minute and the unit was zeroed, balanced and calibrated according to the standard procedure. FIGS. 1-7 were generated from data supplied by the Sintech 2 system.

Three samples were tested before oven aging started (i.e., zero days oven aging). Each test consisted of elongating the sample about 250%, relaxing the sample by returning the jaw faces to the original 3 inch gauge length, and then elongating the sample to break (i.e., ultimate elongation). Tensile energy absorbed during the 250% elongation and subsequent relaxation was measured. Tension at 250% elongation was also measured. The tests were repeated at intervals of several days, typically from about 3 to 15 days, for each set of three samples (as noted above, the sample adjacent the cardboard strip was not tested). The actual number of days each test was conducted after the start of oven-aging for a set of three samples is identified in the Tables. Samples were tested for up to about 90 days or until the sample degraded, that is, until the tensile energy absorbed by a sample at 250 percent extension measured less than about 50 percent of the tensile energy absorbed for an identical control sample.

The tensile energy absorbed (TEA) as used in the examples and associated tables is calculated as the integral under a stress versus strain (load versus elongation) curve measured from the beginning to the end of the cycle section being measured, divided by the area of the sample (i.e., sample width × gauge length) between the grips at the start of the test. The tensile energy absorbed (TEA) for each sample is reported in units of grams$_{force}$· centimeter per square centimeter of sample. Tension (also called "load") at 250 percent elongation was determined for each sample and reported in units of grams$_{force}$. Ultimate elongation is expressed as a percent ((final length−initial length)/initial length)* 100.

EXAMPLE A

An extrudable elastomeric composition was prepared from a blend of approximately 63 percent, by weight, Kraton ® G 1657 elastomeric block copolymer (having about 0.07%, by weight, antioxidant); about 20 percent, by weight, PE NA 601-00 polyethylene; and about 17 percent, by weight, Regalrez ® tackifying resin. Part of this blend was pelletized and saved as a control. The remaining portions of the blend were combined with one or more transition metal compounds as described above and then pelletized to provide samples having various concentrations of transition metal(s). Each of these pelletized samples was formed into elastomeric nonwoven webs of meltblown fibers as described above. Oven aging studies were conducted on samples of the webs to measure the effects of exposure to a thermally oxidative environment. Reported in Table 1 is the transition metal compound added to the blend, its approximate concentration, the basis weight of the nonwoven web, and the results of tensile strength tests at the identified intervals for the following properties: Tensile Energy Absorbed (TEA) during the Extension cycle; Tensile Energy Absorbed (TEA) during the Retraction cycle; Tension at an elongation of about 250%; and the Ultimate Elongation (Elongation to break).

Example A1 (Control) shows that the basic elastomeric formulation without transition metal compounds is stable in a thermally oxidative environment for at least about ninety days.

Examples A2, A3, A4 and A5 show that the elastomeric formulation containing up to about 0.01 percent by weight cobalt (II) or cobalt (III) individually or together is stable in a thermally oxidative environment for at least about ninety days. Example A2 was not tested beyond forty five days in a thermally oxidative environment.

Examples A6 and A7 show that the elastomeric formulation containing up to about 0.01 percent by weight copper (II) is stable in a thermally oxidative environment for at least about ninety days.

Examples A8 and A9 show that the elastomeric formulation containing up to about 0.01 percent by weight Zinc (II) or Iron (III) is stable in a thermally oxidative environment for at least about ninety days.

EXAMPLE B

A blend was prepared as described in Example A except that the Kraton ® G 1657 elastomeric block copolymer contained about 0.042%, by weight, antioxidant. Part of this blend was pelletized and saved as a control. The remaining portions of the blend were combined with one or more transition metal compounds as described above and then pelletized to provide samples having various concentrations of transition metal(s). Each of these pelletized samples was formed into elastomeric nonwoven webs of meltblown fibers as described above. Oven aging studies were conducted on samples of the webs to measure the effects of exposure to a thermally oxidative environment. Description of the samples and test results are reported in Table 2 using the format of Table 1.

Example B1 (Control) was tested under the same conditions as the other materials of Example B to confirm that the basic elastomeric formulation without transition metal compounds is stable in a thermally oxidative environment for at least about ninety days.

Surprisingly, Example B2 shows that the elastomeric formulation containing about 0.01 percent by weight cobalt (II) as N,N'-bis (salicylidene) ethylenediaminocobalt (II) degrades in a thermally oxidative environment after about twenty six days (as determined from a graph of tensile energy absorbed versus aging time). Importantly, a test of the Example B2 material which was stored at room temperature for 34 days shows that its elastic properties are identical to those of the Example B2 material before being exposed to a thermally oxidative environment, i.e. at zero days of exposure to the thermally oxidative environment.

Example B3 is an elastomeric material which contains about 0.04 percent by weight total cobalt; of which about 0.02 percent by weight is cobalt (III) present as cobalt (III) acetylacetonate and about 0.02 percent by weight is cobalt (II) present as cobalt (II) stearate. Example B3 shows that an elastomeric formulation of this invention which contains about 0.04 percent by weight total cobalt degrades in a thermally oxidative environment in about eight days (as determined from a graph of tensile energy absorbed versus aging time). Importantly, a test of the Example B3 material which was stored at room temperature for 34 days shows that its elastic properties are almost identical to those of the Example B3 material before being exposed to a thermally oxidative environment, i.e. at zero days of exposure to the thermally oxidative environment.

Examples B4, B5 and B6 show that elastomeric formulations containing up to about 0.025 percent by weight copper (II) are stable in thermally oxidative environment for at least about ninety days.

EXAMPLE C

A blend was prepared as described in Example A. Part of this blend was pelletized and saved as a control. The remaining portions of the blend were combined with one or more transition metal compounds as described above and then pelletized to provide samples having various concentrations of transition metal(s) . Each of these pelletized samples was formed into elastomeric nonwoven webs of meltblown fibers as described above. Oven aging studies were conducted on samples of the webs to measure the effects of exposure to a thermally oxidative environment. Description of the samples and test results are reported in Table 3 using the format of Table 1. The concentrations of transition metal(s) reported in Table 3 for each blend was measured by elemental analysis of the pellets which were used to form the meltblown fiber webs.

Example C1 (Control) was made and tested at the same time that the other Example C items were made and tested. This was done to demonstrate that the basic elastomeric formulation without transition metal compound is stable in a thermally oxidative environment for at least about sixty five days, which is the maximum exposure of Example C materials to a thermally oxidative environment.

Examples C2 and C3 show that elastomeric formulations containing up to about 0.032 percent by weight copper (II) are stable in a thermally oxidative environment for at least about sixty four days, i.e., when testing was stopped.

Examples C4 and C5 show that elastomeric formulations containing up to about 0.051 percent by weight Zinc (II) are stable in a thermally oxidative environment for at least about sixty five days, i.e., when testing was stopped.

Examples C6 and C7 respectively show that the elastomeric formulation containing up to about 0.027 percent by weight Iron (III) or Chromium (III) is stable in a thermally oxidative environment for at least about sixty four days, i.e., when testing was stopped.

Unexpectedly, the elastomeric material of Example C8 degraded in a thermally oxidative environment in about nine days (as determined from a graph of tensile energy absorbed versus aging time). The elastomeric material of Example C8 contained about 0.026 percent by weight manganese (III) as manganese (III) acetylacetonate. A test of the Example C8 material that was stored at room temperature for 20 days shows that its elastic properties are about the same as those of the Example C8 material before being exposed to a thermally oxidative environment, i.e. at zero days of exposure to the thermally oxidative environment.

The elastomeric material of Example C9 degraded in a thermally oxidative environment in about twenty five days (as determined from a graph of tensile energy absorbed versus aging time). The elastomeric formulation of Example C9 contained about 0.034 percent by weight manganese (II) as manganese (II) stearate. A test of the Example C9 material that was stored at room temperature for fifty-five days shows that its elastic properties are about the same as those of the Example C9 material before being exposed to a thermally oxidative environment, i.e. at zero days of exposure to the thermally oxidative environment.

EXAMPLE D

A blend was prepared as described in Example A. Part of this blend was pelletized and saved as a control. The remaining portions of the blend were combined with one or more transition metal compounds as described above and then pelletized to provide samples having various concentrations of transition metal(s). Some samples were prepared by mixing pelletized blends containing different concentrations of transition metal(s).

Example D also includes two blends that contain a rubber having a high degree of residual ethylenic unsaturation (e.g., relatively unsaturated) in order to determine the effects of such material on the extrudable compositions in the absence of any transition metal compounds. Example D5 was blended as described above to contain about 15.75 percent, by weight, Kraton ® D 1107 elastomeric block copolymer (having styrene endblocks and an isoprene midblock); about 47.25 percent, by weight, Kraton ® G 1657 elastomeric block copolymer (having about 0.042%, by weight, anti-oxidant); about 20 percent, by weight, PE NA 601-00 polyethylene; and about 17 percent, by weight, Regalrez ® tackifying resin. The material was pelletized as described above.

Example D6 was blended to contain about 6.3 percent, by weight, Kraton ® D 1107 elastomeric block copolymer; about 56.7 percent, by weight, Kraton ® G 1657 elastomeric block copolymer; about 20 percent, by weight, PE NA 601-00 polyethylene; and about 17 percent, by weight, Regalrez ® tackifying resin. The material was pelletized as described above.

Each of these pelletized samples were formed into elastomeric nonwoven webs of meltblown fibers as described above. Oven aging studies were conducted on samples of the webs to measure the effects of exposure to a thermally oxidative environment. Description of the samples and the test results are reported in Table 4 using the format of Table 1.

Examples D1 through D4 showed the times, as measured in days, that various combinations of Co (II) as cobalt (II) acetylacetonate and Co (III) as cobalt (III) acetylacetonate caused the elastomeric formulation of this invention to degrade in a thermally oxidative environment.

The elastomeric material of Example D1 contained about 0.015 percent by weight of cobalt. The elastomeric material of Example D1 degraded in a thermally oxidative environment in about fifty five days (as determined from a graph of tensile energy absorbed versus aging time).

The elastomeric materials of Examples D2 and D3 contained respectively about 0.0225 percent of weight of cobalt. The elastomeric materials of Examples D2 and D3 degraded in a thermally oxidative environment in about thirty two days (as determined from a graph of tensile energy absorbed versus aging time).

The elastomeric material of Example D4 contained about 0.03 percent by weight of cobalt. The elastomeric material of Example D4 degraded in about thirty four days in a thermally oxidative environment (as determined from a graph of tensile energy absorbed versus aging time).

Examples D5 and D6 showed the effect of a rubber having a high degree of residual ethylenic unsaturation, e.g. Kraton ® D1107-0, on the stability of the extrudable elastomeric composition. In the absence of any transition metal compounds, Kraton ® D1107-0 had no effect on the stability of the extrudable elastomeric composition in a thermally oxidative environment.

EXAMPLE E

A blend was prepared as described in Example A. Part of this blend was pelletized and saved as a control. The remaining portions of the blend were combined with one or more transition metal compounds as described above and then pelletized to provide samples having various concentrations of transition metal(s). Each of these pelletized samples was formed into elastomeric nonwoven webs of meltblown fibers as described above. Oven aging studies were conducted on samples of the webs to measure the effects of exposure to a thermally oxidative environment. The concentration of transition metal (e.g., cobalt) for each blend was measured by elemental analysis of its corresponding meltblown fiber web sample. Description of the samples and the test results are reported in Table 5 using the format of Table 1 with the addition of a column to report the results of elemental analysis.

Example E1 (Control) and Examples E2 through E6 were made and tested at the same time. This was done to demonstrate that the basic elastomeric formulation without transition metal compound was stable in the thermally oxidative environment during the testing time interval.

The respective "parts per million" (ppm) cobalt (II) and cobalt (III) reported in the column headed, "Item" were the amounts added to each formulation during blending. The respective ppm in the column headed, "Elemental Analysis (PPM)" were the parts per million total cobalt actually measured in a sample of the final meltblown webs.

Examples E2 through E6 showed the times, as measured in days, that various combinations of Co (II) as cobalt (II) stearate and Co (III) as cobalt (III) acetylacetonate caused the elastomeric formulation of this invention to degrade in a thermally oxidative environment.

The elastomeric material of Example E2 contained about 0.013 percent by weight of cobalt. The elastomeric material of Example E2 degraded in a thermally oxidative environment in about thirty eight days (as determined from a graph of tensile energy absorbed versus aging time).

The elastomeric materials of Examples E3 and E4 contained respectively about 0.022 percent by weight of cobalt. The elastomeric materials of Examples E3 and E4 degraded in a thermally oxidative environment in about twenty six and twenty nine days respectively (as determined from a graph of tensile energy absorbed versus aging time).

The elastomeric materials of Examples E5 and E6 each contained about 0.03 percent by weight of cobalt. The elastomeric materials of Examples E5 and E6 degraded after about twenty one days exposure to a thermally oxidative environment (as determined from a graph of tensile energy absorbed versus aging time).

EXAMPLE F

A blend was prepared as described in Example A. Part of this blend was pelletized and saved as a control. The remaining portions of the blend were combined with one or more transition metal compounds as described above and then pelletized to provide samples having various concentrations of transition metal(s). Each of these pelletized samples was formed into elastomeric nonwoven webs of meltblown fibers as described above. Oven aging studies were conducted on samples of the webs to measure the effects of exposure to a thermally oxidative environment. Description of the samples and test results are reported in Table 6 using the format of Table 1.

Example F1 (Control) and Examples F2 through F6 materials were made and tested at the same time. This was done to demonstrate that Example F1 (Control), the basic elastomeric formulation without transition metal compound was stable in the thermally oxidative environment during the time interval for testing.

The elastomeric materials of Examples F2 through F6 all contained about 0.04 percent by weight of cobalt. The elastomeric materials of Examples F2 through F4 and Example F6 all degraded in a thermally oxidative environment in less than about ten days (as determined from a graph of tensile energy absorbed versus aging time).

The elastomeric material of Example F5 degraded in a thermally oxidative environment in about seventeen days (as determined from a graph of tensile energy absorbed versus aging time). The cobalt (II) in Example F5 was added as a pre-blended concentrate of cobalt (II) stearate in polypropylene.

Tests of the materials of Examples F2 through F6 that were stored at room temperature for thirteen days showed that their elastic properties are about identical to those of the Example F2 through F6 materials before being exposed to a thermally oxidative environment, i.e. at zero days of exposure to the thermally oxidative environment.

EXAMPLE G

A first master blend of an extrudable elastomeric composition was prepared as described in Example A. This blend contained approximately 63 percent, by weight, Kraton ® G 1657 elastomeric block copolymer (having about 0.042%, by weight, anti-oxidant); about 20 percent, by weight, PE NA 601-00 polyethylene; and about 17 percent, by weight, Regalrez ® tackifying resin.

A second master blend of an extrudable elastomeric composition was prepared as described in Example A. This blend contained approximately 61 percent, by weight, Kraton ® G 1657 elastomeric block copolymer (having about 0.042%, by weight, anti-oxidant); about 19 percent, by weight, polypropylene HH441 (available from Himont U.S.A. of Wilmington, Del.); about 16 percent, by weight, Regalrez ® tackifying resin; and about 4 percent, by weight, 2,5-dimethylhexane-2,5-dihydroperoxide in the form of Luperox 2,5-2,5; an organic hydroperoxide available as a free flowing powder from Atochem North America of Buffalo, N.Y. Information supplied by Atochem North America indicates that Luperox 2,5-2,5 contains about 70 percent, by weight, 2,5-dimethylhexane-2,5-dihydroperoxide and about 30 percent, by weight, water.

These first and second master blends were combined to make a control (i.e., example G1) extrudable elastomeric composition that contained about 0.05 percent, by weight, 2,5-dimethylhexane-2,5-dihydroperoxide. Other portions of the master blends were combined with one or more blends containing transition metal compounds to provide samples having various concentrations of the transition metal(s) and about 0.05 percent, by weight, 2,5-dimethylhexane-2,5-dihydroperoxide.

Each of these pelletized samples was formed into elastomeric nonwoven webs of meltblown fibers as described above. Oven aging studies were conducted on samples of the webs to measure the effects of exposure to a thermally oxidative environment. Description of the samples and test results are reported in Table 7 using the format of Table 1.

The control (i.e., Example G1) elastomeric nonwoven web of meltblown fibers that contained about 0.05 percent, by weight, 2,5-dimethylhexane-2,5-dihydroperoxide was prepared as described above. This elastomeric nonwoven web did not degrade after at least about sixty days continuous exposure to a thermally oxidative environment.

Example G2 elastomeric nonwoven web of meltblown fibers was made of the same formulation as control Example G1, except Example G2 material also contained about 0.015 percent by weight cobalt as cobalt (II) stearate and cobalt (III) acetylacetonate. The elastomeric web of Example G2 degraded in a thermally oxidative environment in about twenty four days (as determined from a graph of tensile energy absorbed versus aging time).

Example G2 which contained added hydroperoxide and cobalt degraded in much less time (about twenty four days) than Example E2 which contained added cobalt, but no added hydroperoxide and which required about thirty eight days to degrade (as determined from a graph of tensile energy absorbed versus aging time). Surprisingly, it appears that the combination of hydroperoxide and cobalt shortened the time to degradation in a thermally oxidative environment from thirty eight days to twenty four days. In the elastomeric formulation of Example G1 hydroperoxide, without cobalt, was ineffective, for at least about sixty days, in causing degradation of the elastomeric formulation in a thermally oxidative environment.

Similarly, the elastomeric material of Example G3 which contained about 0.05 percent by weight added hydroperoxide and about 0.023 percent by weight cobalt degraded in about sixteen days in a thermally oxidative environment. The elastomeric material of Example E3 which contained about 0.022 percent by weight added cobalt, but no hydroperoxide, degraded in about twenty six days in a thermally oxidative environment.

Further, the elastomeric material of Example G4 which contained about 0.05 percent by weight added hydroperoxide and about 0.023 percent by weight cobalt degraded in about fifteen days in a thermally oxidative environment. However, the elastomeric material of Example E4 which contained about 0.023 percent by weight added cobalt, but no hydroperoxide, degraded in about twenty nine days in a thermally oxidative environment.

Also, the elastomeric material of Example G5 which contained about 0.05 percent by weight added hydroperoxide and about 0.03 percent by weight cobalt degraded in about fifteen days in a thermally oxidative environment. However, the elastomeric materials of Examples E5 and E6 which contained about 0.03 percent by weight added cobalt, but no hydroperoxide, both degraded in about twenty one days in a thermally oxidative environment.

TABLE 1

| Item | Oven-Aging (Days) | TEA-EXT | TEA-RET | Ten. 250% | Ult Elong |
|---|---|---|---|---|---|
| Example A1 | 0 | 93 | 47 | 416 | 613 |
| (Control) | 3 | 96 | 49 | 430 | 524 |
| 0.07% AO Kraton ® G1657 63% | 6 | 99 | 51 | 446 | 551 |
| PE NA601-00 20% | 11 | 98 | 52 | 443 | 516 |
| Regalrez ® 17% | 17 | 97 | 52 | 440 | 553 |
| Basis Weight 72.1 gsm | 21 | 99 | 53 | 447 | 561 |
| | 32 | 100 | 54 | 448 | 534 |
| | 45 | 100 | 52 | 451 | 521 |
| | 60 | 97 | 51 | 433 | 602 |
| | 76 | 100 | 52 | 447 | 575 |
| | 90 | 95 | 49 | 426 | 555 |
| Example A2 | 0 | 99 | 51 | 439 | 674 |
| Cobalt (III) acetyl- | 3 | 103 | 53 | 463 | 603 |
| acetonate | 6 | 101 | 53 | 457 | 565 |
| 20 ppm Co (III) | 11 | 102 | 53 | 458 | 611 |
| Basis Weight 72.1 gsm | 17 | 108 | 57 | 484 | 550 |
| | 21 | 107 | 57 | 479 | 572 |
| | 32 | 113 | 59 | 499 | 491 |
| | 45 | 112 | 58 | 500 | 591 |
| Example A3 | 0 | 106 | 56 | 475 | 649 |
| Cobalt (III) acetyl- | 3 | 107 | 57 | 482 | 547 |
| acetonate | 6 | 99 | 53 | 450 | 529 |
| 100 ppm Co (III) | 11 | 108 | 57 | 484 | 534 |
| Basis Weight 72.1 gsm | 17 | 106 | 56 | 475 | 519 |
| | 21 | 105 | 56 | 473 | 539 |
| | 32 | 110 | 58 | 488 | 591 |
| | 45 | 108 | 57 | 484 | 531 |
| | 60 | 105 | 55 | 467 | 565 |
| | 76 | 110 | 57 | 487 | 505 |
| | 90 | 103 | 51 | 455 | 628 |
| Example A4 | 2 | 110 | 54 | 492 | 563 |
| Cobalt (II) stearate | 13 | 121 | 59 | 536 | 529 |
| 100 ppm Co (II) | 30 | 114 | 54 | 505 | 527 |
| Basis Weight 70.5 gsm | 49 | 122 | 59 | 532 | 543 |
| | 76 | 117 | 56 | 516 | 513 |
| | 90 | 114 | 54 | 498 | 503 |
| Example A5 | 0 | 111 | 56 | 497 | 594 |
| Cobalt (III) acetyl- | 3 | 118 | 61 | 532 | 463 |
| acetonate | 6 | 117 | 60 | 523 | 481 |
| 50 ppm Co (III) | 11 | 126 | 64 | 559 | 514 |
| plus | 17 | 119 | 61 | 532 | 547 |
| Cobalt (II) stearate | 21 | 117 | 60 | 522 | 588 |
| 50 ppm Co (II) | 32 | 117 | 60 | 518 | 492 |
| Basis Weight 74.6 gsm | 45 | 125 | 64 | 555 | 481 |
| | 60 | 125 | 64 | 549 | 471 |
| | 76 | 93* | 40 | 352 | 397 |
| | 90 | 115 | 57 | 504 | 521 |
| Example A6 | 0 | 97 | 49 | 431 | 714 |
| Copper (II) acetyl- | 3 | 108 | 56 | 486 | 542 |
| acetonate | 6 | 107 | 56 | 482 | 540 |
| 100 ppm Cu (II) | 11 | 108 | 56 | 485 | 538 |
| Basis Weight 71.3 gsm | 17 | 105 | 55 | 470 | 615 |
| | 21 | 113 | 59 | 501 | 621 |
| | 32 | 108 | 56 | 481 | 598 |

TABLE 1-continued

| Item | Oven-Aging (Days) | TEA-EXT | TEA-RET | Ten. 250% | Ult Elong |
|---|---|---|---|---|---|
| | 45 | 110 | 57 | 494 | 580 |
| | 60 | 111 | 58 | 493 | 576 |
| | 76 | 113 | 58 | 502 | 548 |
| | 90 | 112 | 58 | 498 | 603 |
| Example A7 | 0 | 104 | 54 | 464 | 614 |
| Monobasic Copper (II) | 3 | 105 | 57 | 473 | 502 |
| Salicylate | 6 | 98 | 52 | 444 | 598 |
| 100 ppm Cu (II) | 11 | 102 | 54 | 458 | 579 |
| Basis Weight 71.3 gsm | 17 | 105 | 55 | 472 | 457 |
| | 21 | 106 | 56 | 476 | 557 |
| | 32 | 104 | 54 | 464 | 559 |
| | 45 | 104 | 54 | 466 | 515 |
| | 60 | 101 | 53 | 449 | 570 |
| | 76 | 100 | 52 | 447 | 523 |
| | 90 | 107 | 56 | 476 | 572 |
| Example A8 | 0 | 106 | 54 | 472 | 666 |
| Zinc (II) acetyl- | 3 | 109 | 57 | 488 | 571 |
| acetonate | 6 | 111 | 58 | 497 | 544 |
| 100 ppm Zn (II) | 11 | 112 | 58 | 500 | 545 |
| Basis Weight 73.8 gsm | 17 | 114 | 59 | 506 | 584 |
| | 21 | 111 | 58 | 496 | 611 |
| | 32 | 110 | 57 | 491 | 553 |
| | 45 | 110 | 56 | 491 | 567 |
| | 60 | 114 | 59 | 505 | 616 |
| | 76 | 116 | 59 | 514 | 582 |
| | 90 | 117 | 60 | 517 | 508 |
| Example A9 | 0 | 107 | 55 | 512 | 589 |
| Iron (III) acetyl- | 3 | 107 | 56 | 480 | 533 |
| acetonate | 6 | 111 | 58 | 498 | 533 |
| 100 ppm Fe (III) | 17 | 108 | 56 | 481 | 559 |
| Basis Weight 73.8 gsm | 21 | 107 | 57 | 479 | 595 |
| | 32 | 109 | 58 | 487 | 571 |
| | 45 | 113 | 59 | 500 | 533 |
| | 60 | 109 | 57 | 482 | 540 |
| | 76 | 116 | 60 | 512 | 533 |
| | 90 | 109 | 57 | 484 | 535 |

*One sample tore during elongation to 250%

TABLE 2

| Item | | Oven-Aging (Days) | TEA-EXT | TEA-RET | Ten. 250% | Ult Elong |
|---|---|---|---|---|---|---|
| Example B1 (Control) | | 0 | 119 | 62 | 535 | |
| 0.042% AO Kraton ® | | 3 | 126 | 64 | 564 | |
| G1657 63% | | 10 | 124 | 63 | 557 | |
| PE NA601-00 20% | | 21 | 127 | 63 | 564 | |
| Regalrez ® 17% | | 32 | 116 | 57 | 517 | |
| Basis Weight 76.2 gsm | | 48 | 125 | 61 | 551 | |
| | | 56 | 133 | 67 | 586 | |
| | | 71 | 130 | 63 | 573 | |
| | | 92 | 128 | 62 | 568 | 496 |
| Example B2 | | 0 | 115 | 61 | 516 | |
| N,N'-bis (salicylidene)- | | 3 | 123 | 63 | 555 | |
| ethylenediamino cobalt (II) | | 10 | 127 | 64 | 564 | |
| 100 ppm Co (II) | | 21 | 83 | 30 | 292 | |
| | Degraded | 32 | 26 | | | |
| | Room Temp Control | >34 | 115 | 60 | 516 | |
| Basis Weight 76.3 gsm | | | | | | |
| Example B3 | | 0 | 138 | 63 | 613 | |
| Cobalt (III) acetyl- | | 3 | 140 | 62 | 623 | |
| acetonate | Degraded | 10 | 33 | | | |
| 200 ppm Co (III) | | | | | | |
| plus Cobalt (II) stearate | | | | | | |
| 200 ppm Co (II) | | | | | | |
| | Room Temp Control | >34 | 130 | 60 | 579 | |
| Basis Weight 74.6 gsm | | | | | | |
| Example B4 | | 0 | 97 | 50 | 436 | |
| Copper (II) Acetate | | 3 | 103 | 53 | 459 | |
| 125 ppm Cu (II) | | 10 | 108 | 56 | 477 | |
| Basis Weight 76.2 gsm | | 21 | 105 | 53 | 467 | |
| | | 32 | 116 | 58 | 510 | |
| | | 48 | 119 | 60 | 522 | |
| | | 56 | 119 | 61 | 525 | |
| | | 71 | 120 | 60 | 527 | |
| | | 92 | 99 | 39 | 383 | 365 |
| Example B5 | | 0 | 111 | 58 | 500 | |

TABLE 2-continued

| Item | Oven-Aging (Days) | TEA-EXT | TEA-RET | Ten. 250% | Ult Elong |
|---|---|---|---|---|---|
| Copper (II) Acetate | 3 | 115 | 59 | 516 | |
| 250 ppm Cu (II) | 10 | 112 | 57 | 501 | |
| Basis Weight 76.2 gsm | 21 | 115 | 59 | 512 | |
| | 32 | 121 | 60 | 533 | |
| | 48 | 117 | 58 | 515 | |
| | 56 | 123 | 62 | 539 | |
| | 71 | 115 | 56 | 507 | |
| | 92 | 114 | 53 | 496 | 503 |
| Example B6 | 0 | 120 | 63 | 538 | |
| Copper (II) acetyl- | 3 | 115 | 58 | 518 | |
| acetonate | 10 | 125 | 62 | 553 | |
| 200 ppm Cu (II) | 21 | 121 | 60 | 534 | |
| Basis Weight 75.4 gsm | 32 | 126 | 62 | 554 | |
| | 48 | 122 | 60 | 537 | |
| | 56 | 122 | 60 | 538 | |
| | 71 | 127 | 61 | 556 | |
| | 92 | 120 | 54 | 517 | 514 |

TABLE 3

| Item | Elemental Analysis (PPM) | Days | TEA-EXT | TEA-RET | Ten. 250% | Ult Elong |
|---|---|---|---|---|---|---|
| Example C1 (Control) | | 0 | 134 | 72 | 597 | 506 |
| 0.042% AO Kraton ® G1657 63% | | 5 | 126 | 66 | 559 | 533 |
| PE NA601-00 20% | | 9 | 128 | 65 | 562 | 488 |
| Regalrez ® 17% | | 16 | 135 | 69 | 595 | 488 |
| Basis Weight 77.9 gsm | | 21 | 131 | 67 | 575 | 549 |
| | | 27 | 128 | 65 | 560 | 480 |
| | | 45 | 131 | 66 | 572 | 573 |
| | | 64 | 129 | 65 | 560 | 529 |
| Example C2 | | 0 | 116 | 61 | 520 | 538 |
| Copper (II) acetyl- | | 5 | 126 | 65 | 563 | 531 |
| acetonate | 273 | 9 | 129 | 66 | 575 | 488 |
| Basis Weight 76.3 gsm | | 16 | 123 | 61 | 543 | 491 |
| | | 21 | 114 | 57 | 508 | 500 |
| | | 27 | 121 | 60 | 533 | 529 |
| | | 45 | 117 | 57 | 512 | 444 |
| | | 64 | 99 | 43 | 408 | 412 |
| Example C3 | | 0 | 127 | 68 | 566 | 568 |
| Monobasic Copper (II) | | 5 | 116 | 60 | 518 | 504 |
| Salicylate | 316 | 9 | 127 | 66 | 563 | 525 |
| Basis Weight 79.6 gsm | | 16 | 123 | 64 | 544 | 533 |
| | | 21 | 115 | 60 | 507 | 540 |
| | | 27 | 127 | 65 | 557 | 518 |
| | | 45 | 126 | 65 | 551 | 530 |
| | | 64 | 118 | 60 | 519 | 488 |
| Example C4 | | 0 | 110 | 57 | 495 | 565 |
| Zinc (II) | 394 | 5 | 115 | 59 | 509 | 485 |
| Acetylacetonate | | 10 | 107 | 54 | 470 | 461 |
| Basis Weight 72.9 gsm | | 20 | 120 | 61 | 536 | 501 |
| | | 30 | 126 | 63 | 559 | 489 |
| | | 41 | 112 | 56 | 495 | 502 |
| | | 55 | 113 | 56 | 494 | 493 |
| | | 65 | 119 | 58 | 525 | 450 |
| Example C5 | | 0 | 96 | 49 | 432 | 528 |
| Zinc (II) stearate | 512 | 5 | 105 | 53 | 465 | 490 |
| Basis Weight 72.9 gsm | | 10 | 106 | 53 | 466 | 496 |
| | | 20 | 114 | 57 | 507 | 547 |
| | | 30 | 121 | 61 | 542 | 561 |
| | | 41 | 114 | 57 | 509 | 511 |
| | | 55 | 120 | 59 | 526 | 504 |
| | | 65 | 109 | 54 | 484 | 526 |
| Example C6 | | 0 | 94 | 49 | 421 | 540 |
| Iron (III) | | 5 | 108 | 56 | 477 | 527 |
| Acetylacetonate | 274 | 10 | 100 | 51 | 438 | 524 |
| Basis Weight 72.9 gsm | | 20 | 115 | 59 | 508 | 489 |
| | | 30 | 107 | 54 | 470 | 514 |
| | | 41 | 97 | 49 | 430 | 489 |
| | | 55 | 107 | 53 | 467 | 506 |
| | | 65 | 101 | 48 | 443 | 534 |
| Example C7 | | 0 | 109 | 58 | 481 | 595 |
| Chromium (III) acetyl- | | 5 | 114 | 59 | 507 | 546 |
| acetonate | 265 | 9 | 107 | 54 | 474 | 577 |
| Basis Weight 77.9 gsm | | 16 | 116 | 59 | 511 | 578 |
| | | 21 | 109 | 56 | 481 | 501 |
| | | 27 | 116 | 59 | 507 | 493 |
| | | 45 | 113 | 57 | 490 | 587 |

TABLE 3-continued

| Item | Elemental Analysis (PPM) | Days | TEA-EXT | TEA-RET | Ten. 250% | Ult Elong |
|---|---|---|---|---|---|---|
| | | 64 | 120 | 60 | 525 | 542 |
| Example C8 | | 0 | 111 | 57 | 496 | 529 |
| Manganese (III) | | 5 | 126 | 65 | 561 | 539 |
| acetylacetonate | 260 Degraded | 10 | 19 | | | |
| Basis Weight 72.9 gsm | Room Temp Control | >20 | 117 | 61 | 526 | 519 |
| Example C9 | | 0 | 103 | 53 | 458 | 534 |
| Manganese (II) | | 5 | 112 | 57 | 489 | 571 |
| stearate | 339 | 10 | 103 | 51 | 446 | 527 |
| Basis Weight 72.9 gsm | | 20 | 98 | 47 | 418 | 490 |
| | Degraded | 30 | 4 | | | |
| | Room Temp Control | >55 | 107 | 55 | 466 | 581 |

TABLE 4

| Item | | Oven-Aging (Days) | TEA-EXT | TEA-RET | Ten. 250% | Ult Elong |
|---|---|---|---|---|---|---|
| Example D1 | | 0 | 94 | 48 | 418 | 525 |
| 75 ppm Co (III) as | | 6 | 95 | 48 | 430 | 498 |
| Cobalt (III) acetyl- | | 13 | 100 | 50 | 447 | 500 |
| acetonate plus | | 20 | 106 | 53 | 480 | 457 |
| 75 ppm Co (II) as | | 40 | 82 | 34 | 343 | 390 |
| Cobalt (II) acetyl- | Degradation Underway | 53 | 56 | 13 | 139 | 322 |
| acetonate | Degraded | 60 | 21 | | | |
| Basis Weight 66.3 gsm | | | | | | |
| Example D2 | | 0 | 91 | 46 | 406 | 567 |
| 150 ppm Co (III) as | | 6 | 102 | 52 | 456 | 499 |
| Cobalt (III) acetyl- | | 13 | 108 | 54 | 480 | 466 |
| acetonate plus | | 21 | 82 | 33 | 346 | 416 |
| 75 ppm Co (II) as | Degraded | 40 | 9 | | | |
| Cobalt (II) acetyl- | | | | | | |
| acetonate | | | | | | |
| Basis Weight 66.3 gsm | | | | | | |
| Example D3 | | 0 | 90 | 46 | 401 | 550 |
| 75 ppm Co (III) as | | 6 | 95 | 48 | 428 | 408 |
| Cobalt (III) acetyl- | | 13 | 101 | 51 | 452 | 472 |
| acetonate plus | | 20 | 89 | 40 | 392 | 400 |
| 150 ppm Co (II) as | Degraded | 40 | 20 | | | |
| Cobalt (II) acetyl- | | | | | | |
| acetonate | | | | | | |
| Basis Weight 67.1 gsm | | | | | | |
| Example D4 | | 0 | 92 | 46 | 407 | 548 |
| 150 ppm Co (III) as | | 6 | 96 | 47 | 421 | 474 |
| Cobalt (III) acetyl- | | 13 | 111 | 56 | 488 | 506 |
| acetonate plus | | 20 | 106 | 50 | 461 | 437 |
| 150 ppm Co (II) as | Degraded | 40 | 17 | | | |
| Cobalt (II) acetyl- | | | | | | |
| acetonate | | | | | | |
| Basis Weight 67.1 gsm | | | | | | |
| Example D5 | | 0 | 86 | 42 | 398 | 406 |
| 15.75% Kraton ® D1107-0 | | 6 | 79 | 37 | 361 | 416 |
| 47.25% Kraton ® G1657 | | 13 | 78 | 36 | 356 | 399 |
| 20% PE NA601-00 | | 20 | 85 | 39 | 390 | 394 |
| 17% Regalrez ® | | 40 | 82 | 36 | 370 | 384 |
| (No Metla Additives) | | 53 | 104 | 37 | 419 | 349 |
| Basis Weight not measured | | 60 | 102 | 37 | 421 | 354 |
| Example D6 | | 0 | 85 | 43 | 385 | 441 |
| 6.3% Kraton ® D1107-0 | | 6 | 94 | 47 | 422 | 484 |
| 56.7% Kraton ® G1657 | | 10 | 85 | 41 | 380 | 467 |
| 20% PE NA601-00 | | 20 | 92 | 45 | 413 | 492 |
| 17% Regalrez ® | | 32 | 88 | 43 | 392 | 487 |
| (No metal additives) | | | | | | |
| Basis Weight 65.5 gsm | | | | | | |

TABLE 5

| Item | Elemental Analysis (PPM) | Days | TEA-EXT | TEA-RET | Ten. 250% | Ult Elong |
|---|---|---|---|---|---|---|
| Example E1 | | 0 | 93 | 48 | 419 | 525 |
| 0.042% AO Kraton ® G1657 63% | | 5 | 97 | 49 | 435 | |
| PE NA601-00 20% | | 13 | 95 | 48 | 426 | 480 |
| Regalrez ® 17% | | 23 | 100 | 50 | 450 | 514 |
| Basis Weight 66.3 gsm | | 28 | 89 | 44 | 402 | 469 |
| | | 33 | 102 | 49 | 459 | 459 |
| | | 41 | 95 | 47 | 426 | 454 |
| | Room Temp Control | >42 | 87 | 44 | 394 | 491 |
| Example E2 | | 0 | 92 | 46 | 409 | 500 |

TABLE 5-continued

| Item | Elemental Analysis (PPM) | | Days | TEA-EXT | TEA-RET | Ten. 250% | Ult Elong |
|---|---|---|---|---|---|---|---|
| Cobalt (II) stearate | | | 5 | 97 | 49 | 430 | |
| 75 ppm Co (II) | | | 13 | 96 | 48 | 429 | 472 |
| Cobalt (III) acetyl- | | | 23 | 92 | 45 | 407 | 487 |
| acetonate 75 ppm Co (III) | 134 | | 28 | 84 | 35 | 370 | 466 |
| Basis Weight 65.5 gsm | | | 33 | 84 | 34 | 336 | 361 |
| | | Degraded | 40 | 29 | | | |
| | | Room Temp Control | >42 | 96 | 48 | 429 | 473 |
| Example E3 | | | 0 | 89 | 44 | 395 | 527 |
| Cobalt (II) stearate | | | 5 | 87 | 44 | 391 | |
| 75 ppm Co (II) | | | 13 | 90 | 45 | 403 | 472 |
| Cobalt (III) acetyl- | | | 23 | 58 | 16 | 173 | 296 |
| acetonate 150 ppm Co (III) | 222 | Degraded | 28 | 30 | | | |
| Basis Weight 65.5 gsm | | | | | | | |
| | | Room Temp Control | >42 | 94 | 47 | 422 | 508 |
| Example E4 | | | 0 | 85 | 43 | 381 | 522 |
| Cobalt (II) stearate | | | 5 | 96 | 49 | 427 | |
| 150 ppm Co (II) | | | 13 | 99 | 50 | 439 | 522 |
| Cobalt (III) acetyl- | | | 23 | 73 | 28 | 263 | 333 |
| acetonate 75 ppm Co (III) | 226 | | 28 | 50 | 13 | 165 | 336 |
| | | Degraded | 33 | 16 | | | |
| | | Room Temp Control | >42 | 100 | 51 | 448 | 482 |
| Basis Weight 64.7 gsm | | | | | | | |
| Example E5 | | | 0 | 88 | 44 | 391 | 553 |
| Cobalt (II) stearate | | | 5 | 93 | 47 | 414 | |
| 150 ppm Co (II) | | | 13 | 89 | 44 | 396 | 530 |
| Cobalt (III) acetyl- | | Degraded | 23 | 31 | | | |
| acetonate 150 ppm Co (III) | | 291 | | | | | |
| | | Room Temp Control | >42 | 91 | 46 | 406 | 509 |
| Basis Weight 65.5 gsm | | | | | | | |
| Example E6 | | | 0 | 85 | 43 | 380 | 515 |
| Cobalt (II) stearate | | | 5 | 93 | 47 | 415 | |
| 200 ppm Co (II) | | | 13 | 90 | 45 | 403 | 497 |
| Cobalt (III) acetyl- | | Degraded | 23 | 24 | | | |
| acetonate 200 ppm Co (III) | | 303 | | | | | |
| | | Room Temp Control | >42 | 96 | 49 | 430 | 504 |
| Basis Weight 65.5 gsm | | | | | | | |

TABLE 6

| Item | | Oven-Aging (Days) | TEA-EXT | TEA-RET | Ten. 250% | Ult Elong |
|---|---|---|---|---|---|---|
| Example F1 (Control) | | 0 | 110 | 58 | 493 | 564 |
| 0.042% AO Kraton ® G1657 63% | | 5 | 113 | 59 | 502 | 590 |
| PE NA601-00 20% | | 10 | 105 | 55 | 467 | 500 |
| Regalrez ® 17% | | 17 | 112 | 59 | 497 | 528 |
| Basis Weight 77.1 gsm | | 31 | 115 | 60 | 507 | 534 |
| | | 45 | 104 | 54 | 458 | 514 |
| Example F2 | | 0 | 101 | 53 | 450 | 584 |
| Cobalt (II) stearate, | | 5 | 84 | 42 | 369 | 494 |
| 377 ppm Co (II) | Degraded | 10 | 46 | 10 | 116 | 291 |
| | Room Temp Control | >13 | 97 | 51 | 431 | 533 |
| Basis Weight 76.2 gsm | | | | | | |
| Example F3 | | 0 | 112 | 58 | 499 | 521 |
| Cobalt (III) acetyl- | | 5 | 110 | 55 | 488 | 485 |
| acetonate 377 ppm Co (III) | Degraded | 10 | 44 | | | |
| | Room Temp Control | >13 | 98 | 50 | 436 | 531 |
| Basis Weight 73.8 gsm | | | | | | |
| Example F4 | | 0 | 107 | 57 | 480 | 511 |
| 438 ppm Total Cobalt | | 5 | 80 | 33 | 316 | 396 |
| 190 ppm Co (III) as | Degraded | 10 | 16 | | | |
| Cobalt (III) acetyl- | | | | | | |
| acetonate, 248 ppm Co (II) | | | | | | |
| as cobalt (II) stearate | | | | | | |
| | Room Temp Control | >13 | 110 | 59 | 493 | 528 |
| Basis Weight 73.8 gsm | | | | | | |
| Example F5 | | 0 | 130 | 60 | 579 | 493 |
| 437 ppm Total Co | | 5 | 123 | 55 | 549 | 501 |
| 190 ppm Co (III) as | | 10 | 99 | 26 | 339 | 350 |
| Cobalt (III) acetyl- | Degraded | 17 | 64 | 11 | 125 | 309 |
| acetonate, | | | | | | |
| 247 ppm Co (II) | | | | | | |
| as Cobalt (II) stearate | | | | | | |
| Concentrate in PP | | | | | | |
| | Room Temp Control | >13 | 124 | 57 | 555 | 505 |
| Basis Weight 77.1 gsm | | | | | | |
| Example F6 | | 0 | 101 | 53 | 453 | 515 |
| 402 ppm total Cobalt | | 5 | 58 | 19 | 227 | 442 |

TABLE 6-continued

| Item | Oven-Aging (Days) | TEA-EXT | TEA-RET | Ten. 250% | Ult Elong |
|---|---|---|---|---|---|
| 282 ppm as Cobalt (III) acetylacetonate, 120 ppm as Cobalt (II) stearate | Degraded | 10 | 47 | | |
| Basis Weight 70.5 gsm | Room Temp Control | >13 | 110 | 58 | 499 | 448 |

TABLE 7

| Item | | Oven-Aging (Days) | TEA-EXT | TEA-RET | Ten. 250% | Ult Elong |
|---|---|---|---|---|---|---|
| Example G1 | | 0 | 103 | 49 | 457 | 539 |
| Kraton ® G1657 | | 6 | 82 | 39 | 364 | 510 |
| PP HH441 | | 10 | 101 | 47 | 449 | 481 |
| PE NA601-00 | | 20 | 97 | 45 | 427 | 515 |
| Regalrez ® | | 28 | 99 | 46 | 437 | 543 |
| plus 0.05% 2,5-dimethylhexane- | | 32 | 98 | 46 | 433 | 502 |
| 2,5-dihydroperoxide. | | 53 | 101 | 46 | 444 | 487 |
| Basis Weight 68.8 gsm | | 60 | 102 | 47 | 447 | 556 |
| Example G2 | | 0 | 98 | 49 | 437 | 542 |
| Cobalt (II) stearate | | 6 | 99 | 48 | 442 | 462 |
| 75 ppm Co (II) | | 10 | 102 | 50 | 455 | 493 |
| Cobalt (III) acetyl- | | 20 | 84 | 33 | 351 | 355 |
| acetonate, 75 ppm Co (III) | Degraded | 28 | 12 | | | |
| plus 0.05% ROOH[1] | | | | | | |
| Basis Weight 65.5 gsm | | | | | | |
| Example G3 | | 0 | 80 | 40 | 356 | 565 |
| Cobalt (II) stearate | | 6 | 96 | 46 | 425 | 538 |
| 75 ppm Co (II) | | 10 | 85 | 41 | 378 | 494 |
| Cobalt (III) acetyl- | Degraded | 20 | 9 | | | |
| acetonate, 150 ppm Co (III) | | | | | | |
| plus 0.05% ROOH[1] | | | | | | |
| Basis Weight 65.5 gsm | | | | | | |
| Example G4 | | 0 | 98 | 49 | 438 | 511 |
| Cobalt (II) stearate | | 6 | 95 | 46 | 421 | 505 |
| 150 ppm Co (II) | | 10 | 85 | 41 | 379 | 513 |
| Cobalt (III) acetyl- | Degraded | 20 | 12 | | | |
| acetonate, 75 ppm Co (III) | | | | | | |
| plus 0.05% ROOH[1] | | | | | | |
| Basis Weight 66.3 gsm | | | | | | |
| Example G5 | | 0 | 98 | 49 | 441 | 497 |
| Cobalt (II) stearate | | 6 | 99 | 49 | 441 | 519 |
| 150 ppm Co (II) | | 10 | 89 | 43 | 394 | 539 |
| Cobalt (III) acetyl- | Degraded | 20 | 7 | | | |
| acetonate, 150 ppm Co (III) | | | | | | |
| plus 0.05% ROOH[1] | | | | | | |
| Basis Weight 65.5 gsm | | | | | | |

[1]2,5-dimethylhexane-2,5-dihydroperoxide

A brief summary of the effects of various transition metal compounds on the extrudable elastomeric compositions of the present invention is presented in Table 8.

TABLE 8

| Example | Transition Metal Compound | Weight Percent of Transition Metal in Extrudable Elastomeric Composition | Degradation Time (Days) in Thermally Oxidative Environment | Condition of Room Temperature Retain (Days) |
|---|---|---|---|---|
| 1 | Cobalt (II) Stearate | 0.0377 | 10 | Unchanged (13) |
| 2 | Manganese (II) Stearate | 0.0339 | 25 | Unchanged (55) |
| 3 | Cobalt (III) Acetylacetonate | 0.0377 | 10 | Unchanged (13) |
| 4 | Manganese (III) Acetylacetonate | 0.0260 | 9 | Unchanged (20) |
| 5 | N,N'-bis (salicylidene) ethylenediaminocabalt (II) | 0.0100 | 26 | Unchanged (34) |

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

We claim:

1. An extrudable elastomeric composition adapted to form a sheet which is degraded after less than about 30 days continuous exposure to a thermally oxidative environment, the composition comprising:

from about 60 to about 99 percent, by weight, of an elastomeric A-B-A' block copolymer where A and A' are each a thermoplastic polymer endblock and where B is a conjugated diene monomer unit having a low degree of residual ethylenic unsaturation;

from about 1 to about 40 percent, by weight, of a polyolefin; and an effective amount of at least one transition metal compound which is substantially uniformly distributed in a blend of the polyolefin and block copolymer, said transition metal compound selected from salts and complexes of cobalt and manganese.

2. The extrudable elastomeric composition of claim 1, wherein the transition metal salts contain salts selected from the group consisting of aliphatic carboxylic acid salts having about twelve to about twenty-two carbon atoms and mixtures thereof.

3. The extrudable elastomeric composition of claim 1, wherein the transition metal complexes contain complexing agents selected from the group consisting of acetylacetonates, N-alkyl salicylaldimines, N-phenyl salicylaldimines, N,N'-bis(salicylidene)-1,2-alkanediamines, N,N'-bis(salicylidene)-1,3-alkanediamines, N,N'-bis(salicylidene)-1,2-phenylenediamines and mixtures thereof.

4. The extrudable composition of claim 2 wherein the transition metal salt is selected from the group consisting of cobalt stearate, cobalt oleate, manganese stearate, manganese oleate and mixtures thereof.

5. The extrudable composition of claim 3 wherein the transition metal complex is selected from the group consisting of cobalt(II) acetylacetonate, cobalt(III) acetylacetonate, manganese(II) acetylacetonate, manganese(III) acetylacetonate, N,N'-bis(salicylidene)ethylenediaminocobalt(II), N,N'-bis(salicylidene)ethylenediaminomanganese(II) and mixtures thereof.

6. The extrudable elastomeric composition of claim 1, wherein an elastic sheet formed from the composition is degraded after less than about 20 days continuous exposure to a thermally oxidative environment.

7. The extrudable elastomeric composition of claim 1, wherein an elastic sheet formed from the composition is degraded after less than about 10 days continuous exposure to a thermally oxidative environment.

8. The extrudable elastomeric composition of claim 1, comprising:

from about 60 to about 99 percent, by weight, of the A-B-A' elastomeric block copolymer where A and A' are each a thermoplastic polymer endblock and where B is a conjugated diene monomer unit that has been hydrogenated to an essentially saturated olefin;

from about 1 to about 40 percent, by weight, of a polyolefin; and an amount of the transition metal compound which provides from about 0.01 to about 0.1 percent, by weight, of the transition metal, the transition metal compound selected from transition metal salts and complexes of cobalt and manganese.

9. The extrudable elastomeric composition of claim 8, wherein the elastomeric A-B-A' block copolymer is selected from styrene-poly(ethylene-propylene)-styrene and styrene-poly(ethylene-butylene)-styrene elastomeric block copolymers and mixtures of the same.

10. The extrudable elastomeric composition of claim 8, wherein the polyolefin is selected from the group including polyethylene, polypropylene, polybutylene, ethylene copolymers, propylene copolymers, butylene copolymers and mixtures thereof.

11. The extrudable elastomeric composition of claim 8, wherein the extrudable elastomeric composition further comprises up to about 30 percent by weight of a tackifying resin.

12. The extrudable elastomeric composition of claim 11, wherein the tackifying resin is selected from the group including hydrogenated hydrocarbon resins and terpene hydrocarbon resins.

13. The extrudable elastomeric composition of claim 1, wherein the extrudable elastomeric composition further comprises from about 0.01 to about 0.15 percent by weight of an organic hydroperoxide.

14. The extrudable elastomeric composition of claim 13, wherein the organic hydroperoxide is selected from the group consisting of 2,5-dimethylhexane-2,5-dihydroperoxide, cumene hydroperoxide, and t-butyl hydroperoxide.

15. The extrudable elastomeric composition of claim 8, wherein the transition metal is present in the amount of from about 0.015 to about 0.075 percent, by weight.

16. The extrudable elastomeric composition of claim 8, wherein the transition metal is present in the amount of from about 0.02 to about 0.05 percent, by weight.

17. An elastic sheet which is adapted to degrade after less than 30 days continuous exposure to a thermally oxidative environment, the elastic sheet comprising:

from about 60 to about 99 percent, by weight, of an elastomeric A-B-A' block copolymer where A and A' are each a thermoplastic polymer endblock and where B is a conjugated diene monomer unit having a low degree of residual ethylenic unsaturation;

from about 1 to about 40 percent, by weight, of a polyolefin; and an effective amount of a transition metal compound which is substantially uniformly distributed in a blend of the polyolefin and block copolymer, said transition metal compound selected from salts and complexes of cobalt and manganese.

18. The elastic sheet of claim 17, wherein the sheet further comprises an organic hydroperoxide.

19. The elastic sheet of claim 17, wherein the sheet further comprises a tackifying resin.

20. The elastic sheet of claim 17, wherein the sheet is an elastic nonwoven web of meltblown fibers.

21. The elastic web of claim 20, wherein the web of meltblown fibers includes meltblown microfibers.

22. An elastic sheet which is adapted to degrade after less than about 30 days continuous exposure to a thermally oxidative environment, the elastic sheet consisting essentially of:

from about 60 to about 99 percent, by weight, of an elastomeric A-B-A' block copolymer where A and A' are each a thermoplastic polymer endblock and where B is a conjugated diene monomer unit that has been hydrogenated to an essentially saturated olefin;

from about 1 to about 40 percent, by weight, of a polyolefin; and an amount of a transition metal compound which provides from about 0.01 to about 0.1 percent, by weight of a transition metal which is substantially uniformly distributed in a blend of the polyolefin and block copolymer, said transition metal compound selected from salts and complexes of cobalt and manganese.

23. A coformed elastic nonwoven web which is adapted to degrade after less about 30 days continuous exposure to a thermally oxidative environment, the coformed elastic nonwoven web comprising:
- at least about 20 percent, by weight, of a fibrous nonwoven web of meltblown fibers, said meltblown fibers comprising:
  - from about 60 to about 99 percent, by weight, of an elastomeric A-B-A' block copolymer where A and A' are each a thermoplastic polymer endblock and where B is a conjugated diene monomer unit having a low degree of residual ethylenic unsaturation;
  - from about 1 to about 40 percent, by weight, of a polyolefin; and
  - an amount of a transition metal compound which provides from about 0.01 to about 0.1 percent, by weight of a transition metal which is substantially uniformly distributed in a blend of the polyolefin and block copolymer, said transition metal compound selected from salts and complexes of cobalt and manganese; and
- from greater than about 0 percent, by weight, up to about 80 percent, by weight of at least one other degradable material generally uniformly distributed throughout the fibrous nonwoven web.

24. The coformed elastic web of claim 23, wherein the other degradable material is selected from the group consisting of wood pulp, cellulosic fibers, and natural fibers.

25. The coformed elastic web of claim 23, wherein the web containing meltblown fibers further comprising an organic hydroperoxide.

26. The coformed elastic web of claim 23, wherein the web contains meltblown fibers further comprising a tackifying resin.

27. A composite elastic material comprising:
- an elastic sheet according to claim 17; and
- at least one gatherable layer joined at spaced-apart locations to the elastic sheet so that the gatherable layer is gathered between the spaced-apart locations.

28. A composite elastic material comprising:
- a coformed elastic nonwoven web according to claim 23; and
- at least one gatherable layer joined at spaced-apart locations to the coformed elastic web so that the gatherable layer is gathered between the spaced-apart locations.

* * * * *

UNITED STATES PATENT AND TRADEMARK OFFICE
CERTIFICATE OF CORRECTION

PATENT NO. : 5,308,906
DATED : May 3, 1994
INVENTOR(S) : Jack D. Taylor and William B. Haffner It is certified that error appears in the above-identified patent and that said Letters Patent is hereby corrected as shown below:

Column 11, line 26, "hydrogenated 60-methyl" should read --hydrogenated α -methyl--;

Column 16, line 7, "of the picker roll 66" should read --of the picker roll 66.--;

Column 30, table 2, "Ult Elong" should read --Ult Elong--;
514    545

Column 31, table 4, "(No Metla Additives)" should read --(No Metal Additives)--.

Signed and Sealed this

Ninth Day of January, 1996

Attest:

BRUCE LEHMAN

*Attesting Officer*     *Commissioner of Patents and Trademarks*